United States Patent
Imamura et al.

(10) Patent No.: US 8,083,638 B2
(45) Date of Patent: Dec. 27, 2011

(54) CONTROL DEVICE FOR VEHICLE POWER TRANSMITTING APPARATUS

(75) Inventors: Tatsuya Imamura, Okazaki (JP); Tooru Matsubara, Toyota (JP); Atsushi Tabata, Okazaki (JP); Yuji Iwase, Mishima (JP); Kenta Kumazaki, Toyota (JP); Keita Imai, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 411 days.

(21) Appl. No.: 12/379,791

(22) Filed: Mar. 2, 2009

(65) Prior Publication Data

US 2009/0227408 A1     Sep. 10, 2009

(30) Foreign Application Priority Data

Mar. 4, 2008  (JP) .................................. 2008-053108

(51) Int. Cl.
*B60W 10/08* (2006.01)
*B60W 10/10* (2006.01)
(52) U.S. Cl. .............................. 477/3; 477/115; 477/902
(58) Field of Classification Search .................... 477/15, 477/115, 902
See application file for complete search history.

(56) References Cited

U.S. PATENT DOCUMENTS 6,695,736 B2 *  2/2004  Takenaka ........................... 475/5
2008/0114522 A1 *  5/2008  Matsubara et al. ............. 701/99

FOREIGN PATENT DOCUMENTS

JP       U-01-144555      10/1989
JP       A-2005-264762     9/2005

* cited by examiner

*Primary Examiner* — Edwin A Young
(74) *Attorney, Agent, or Firm* — Oliff & Berridge, PLC

(57) ABSTRACT

A control device for a vehicle power transmitting apparatus is disclosed, having an electrically controlled differential portion operative to control an operating state of an electric motor to control a differential state, and a shifting portion forming part of a power transmitting path between the electrically controlled differential portion and drive wheels, which can minimize deterioration in power performance and degradation in controllability during the shifting. Shift interval altering means 70 is provided for altering an interval L from an operation initiation causing an automatic shifting portion 20 to execute a shifting, to an actual shift initiation depending on a kind of the shifting. This enables an appropriate interval L to be determined for the shifting, thereby obtaining adequate power performance while capable of avoiding a first electric motor M1 from operating in a region outside an operating range. Thus, degradation in controllability is minimized.

20 Claims, 15 Drawing Sheets

|  | C0 | C1 | C2 | B0 | B1 | B2 | B3 | SHIFTING RATIO | STEP |
|---|---|---|---|---|---|---|---|---|---|
| 1st | ◉ | ○ |  |  |  |  | ○ | 3.357 | 1.54 |
| 2nd | ◉ | ○ |  |  |  | ○ |  | 2.180 | 1.53 |
| 3rd | ◉ | ○ |  |  | ○ |  |  | 1.424 | 1.42 |
| 4th | ◉ | ○ | ○ |  |  |  |  | 1.000 | 1.42 |
| 5th |  | ○ | ○ | ◉ |  |  |  | 0.705 | TOTAL 4.76 |
| R |  |  | ○ |  |  |  | ○ | 3.209 |  |
| N |  |  |  |  |  |  |  |  |  |

○ ENGAGED

◉ ENGAGED UPON STEP-VARIABLE
 RELEASED UPON CONTINUOUSLY-VARIABLE

CONTROL DEVICE FOR VEHICLE POWER TRANSMITTING APPARATUS

TECHNICAL FIELD

The present invention relates to a vehicle power transmitting apparatus having an electrically controlled differential portion and a shifting portion. The electrically controlled differential portion is operative to control an operating state of an electric motor, connected to rotary elements of a differential mechanism in a power transmissive state, for controlling a differential state between a rotation speed of an input shaft, to which a drive force source is connected, and a rotation speed of an output shaft to control a differential state. The shifting portion forms a part of a power transmitting path between the electrically controlled differential portion and drive wheels. More particularly, it relates to a technology of performing shift control in the shifting portion.

BACKGROUND ART

There has been known a vehicle power transmitting apparatus including an electrically controlled differential portion and a shifting portion. The electrically controlled differential portion is operative to control an operating state of an electric motor, connected to rotary elements of a differential mechanism in a power transmissive state, for controlling a differential state between a rotation speed of an input shaft, to which a drive force source is connected, and a rotation speed of an output shaft to control a differential state. The shifting portion forms a part of a power transmitting path between the electrically controlled differential portion and drive wheels. For instance, Patent Publication 1 (Japanese Patent Application Publication No. 2005-264762) discloses an example of such a vehicle drive apparatus.

Since such a hybrid type drive apparatus enables a speed ratio to be electrically altered, an engine can be sustained at an optimum operating condition with resultant improvement in fuel consumption. Further, Patent Publication 1 discloses a technology of appropriately controlling the electric motor to allow the engine to immediately start up. In addition to such a disclosure, there has been known another technology disclosed in Patent Publication 2 (Japanese Utility Model Application Publication No. 1-144555).

Meanwhile, with the vehicle power transmitting apparatus set forth above, in a shifting portion, a time interval from an operation initiation, at which the shifting is executed, to an actual shift initiation is caused to vary depending on a kind of the shifting because of a structural reason of the shifting portion. Therefore, if the time interval from the operation initiation for the shifting to the actual shift initiation is uniquely determined so as to avoid, for instance, the electric motor from operating in a region outside an operating range, adequate power performance cannot be obtained. Meanwhile, if the time interval from the operation initiation for the shifting to the actual shift initiation is uniquely determined so as to place priority to power performance, there is a risk of causing the electric motor to operate in the region outside the operating range with resultant degradation in controllability.

The present invention has been completed with the above view in mind and has an object to provide a control device for a vehicle power transmitting apparatus, having an electrically controlled differential portion operative to control an operating state of an electric motor for controlling a differential state between a rotation speed of an input shaft, to which a drive force source is connected, and a rotation speed of an output shaft to control a differential state and a shifting portion forming part of a power transmitting path between the electrically controlled differential portion and drive wheels, which can minimize deterioration in power performance during shifting and degradation in controllability.

For achieving the above object, a first aspect of the present invention relates to a control device for a vehicle power transmitting apparatus having (i) an electrically controlled differential portion operative to control an operating state of an electric motor connected to rotary elements of a differential mechanism in a power transmissive state, for controlling a differential state between a rotation speed of an input shaft to which a drive force source is connected, and a rotation speed of an output shaft, and (ii) a shifting portion forming a part of a power transmitting path between the electrically controlled differential portion and drive wheels.

The control device comprises shift interval altering means for altering an interval from an operation initiation executing a shifting in the shifting portion to an actual shift initiation depending on a kind of the shifting.

According to a second aspect of the present invention, in the first aspect, the interval is defined in terms of torque and/or rotation speed of the electric motor.

According to a third aspect of the present invention, in the first aspect, the interval is defined in terms of an output of the electric motor.

According to a fourth aspect of the present invention, in one of the first to third aspects, the interval is determined such that the greater an operating load, the greater will be the interval.

According to a fifth aspect of the present invention, in one of the first to third aspects, the interval is determined such that the lower temperature of a working oil of the vehicle power transmitting apparatus, the greater will be the interval.

According to a sixth aspect of the present invention, in one of the first to third aspects, the interval is determined such that the higher temperature of a working oil of the vehicle power transmitting apparatus, the greater will be the interval.

According to a seventh aspect of the present invention, in one of the first to third aspects, the interval is determined such that the greater a speed ratio of the shifting portion, the greater will be the interval.

According to an eighth aspect of the present invention, in one of the first to third aspects, the interval is determined such that the greater a step ratio of the shifting portion before and after the shifting, the greater will be the interval.

According to a ninth aspect of the present invention, in one of the first to eighth aspects, the shift initiation is a torque phase initiation or an inertia phase initiation.

According to a tenth aspect of the present invention, in one of the first to ninth aspects, a speed ratio of the shifting portion is step variable.

For achieving the above object, an eleventh aspect of the present invention relates to a control device for a vehicle power transmitting apparatus having (i) an electrically controlled differential portion operative to control an operating state of an electric motor connected to rotary elements of a differential mechanism in a power transmissive state, for controlling a differential state between a rotation speed of an input shaft to which a drive force source is connected, and a rotation speed of an output shaft, and (ii) a shifting portion forming a part of a power transmitting path between the electrically controlled differential portion and drive wheels.

The control device comprises shift timing altering means for altering a timing, at which an operation initiation allows a shifting to be executed in the shifting portion, depending on a kind of the shifting.

According to a twelfth aspect of the present invention, in the eleventh aspect, a timing for the operation initiation is defined in terms of torque and/or rotation speed of the electric motor.

According to a thirteenth aspect of the present invention, in the eleventh aspect, a timing for the operation initiation is defined in terms of an output of the electric motor.

According to a fourteenth aspect of the present invention, in one of the eleventh to thirteenth aspects, a timing for the operation initiation is determined such that the greater an operating load, the faster will be the timing for the operation initiation.

According to a fifteenth aspect of the present invention, in one of the eleventh to thirteenth aspects, a timing for the operation initiation is determined such that the lower temperature of a working oil of the vehicle power transmitting apparatus, the faster will be the timing for the operation initiation.

According to a sixteenth aspect of the present invention, in one of the eleventh to thirteenth aspects, a timing for the operation initiation is determined such that the higher temperature of a working oil of the vehicle power transmitting apparatus, the faster will be the timing for the operation initiation.

According to a seventeenth aspect of the present invention, in one of the eleventh to thirteenth aspects, a timing for the operation initiation is determined such that the greater a speed ratio of the shifting portion, the faster will be the timing for the operation initiation.

According to an eighteenth aspect of the present invention, in one of the eleventh to thirteenth aspects, a timing for the operation initiation is determined such that the greater a step ratio of the shifting portion before and after the shifting, the faster will be the timing for the operation initiation.

According to a nineteenth aspect of the present invention, in one of the eleventh to eighteenth aspects, a speed ratio of the shifting portion is step variable.

A control device for a vehicle power transmitting apparatus recited in the first aspect has shift interval altering means for altering the interval from an operation initiation executing the shifting in the shifting portion to the actual shift initiation depending on a kind of the shifting. Therefore, determining an appropriate interval for the shifting can render adequate power performance, and avoiding the electric motor from operating in the region outside the operating range can minimize degradation in controllability.

With the control device for the vehicle power transmitting apparatus recited in the second aspect, further, since the interval is defined in terms of torque and/or rotation speed of the electric motor, the interval can be easily determined.

With the control device for the vehicle power transmitting apparatus recited in the third aspect, furthermore, since the interval is defined in terms of the output of the electric motor, the interval can be easily determined.

With the control device for the vehicle power transmitting apparatus recited in the fourth aspect, moreover, the interval is determined such that the greater the operating load, the greater will be the interval. This results in leeway in time to allow the shifting to be executed over a long time. This minimizes fluctuation in, for instance, output torque.

With the control device for the vehicle power transmitting apparatus recited in the firth aspect, further, the interval is determined such that the lower the temperature of the working oil in the vehicle power transmitting apparatus, the greater will be the interval. The low oil temperature results in deterioration in response of the hydraulic actuator. However, increasing the interval allows leeway to be obtained, thereby minimizing such an adverse affect.

With the control device for the vehicle power transmitting apparatus recited in the sixth aspect, furthermore, the interval is determined such that the higher the oil temperature of the working oil in the vehicle power transmitting apparatus, the greater will be the interval. Accordingly, the working oil tends to easily leak through a clearance or gap present in a control valve arranged to control the hydraulic pressure with resultant deterioration in response. However, increasing the interval allows leeway in time to be obtained for minimizing such an adverse affect.

With the control device for the vehicle power transmitting apparatus recited in the seventh aspect, moreover, the interval is determined such that the greater the speed ratio of the shifting portion, the greater will be the interval. Accordingly, the greater the speed ratio, the greater will be the acceleration with the reduction in leeway in time. However, increasing the interval allows leeway to be obtained in time. Further, permitting the shifting to be executed such that the lower the gear position to be shifted, the greater will be the interval, enabling the minimization of a rapid change in output torque.

With the control device for the vehicle power transmitting apparatus recited in the eighth aspect, further, the interval is determined such that the greater the step ratio of the shifting portion before and after the shifting, the greater will be the interval. Thus, the shifting can be executed over a long time so as to avoid a rapid change in output torque.

With the control device for the vehicle power transmitting apparatus recited in the ninth aspect, furthermore, the shift initiation is a torque phase initiation or an inertia phase initiation. Accordingly, appropriately determining the interval allows the electric motor to be used within the operating range when the shifting occurs at the torque phase initiation or the inertia phase initiation.

With the control device for the vehicle power transmitting apparatus recited in the tenth aspect, moreover, since a speed ratio of the shifting portion is step variable, the shifting is executed in a stepwise fashion. However, appropriately determining the interval can execute an optimum shifting.

A control device for a vehicle power transmitting apparatus recited in the eleventh aspect includes shift timing altering means for altering timing at which an operation initiation allows the shifting to be executed in the shifting portion, depending on a kind of the shifting. With the shifting operation initiated at appropriate timing during the shifting, adequate power performance can be obtained, and avoiding the electric motor from being used outside the operating range can minimize degradation in controllability.

With the control device for the vehicle power transmitting apparatus recited in the twelfth aspect, further, since the timing for the operation initiation is defined in terms of torque and/or rotation speed of the electric motor, the timing for the operation initiation can be easily determined.

With the control device for the vehicle power transmitting apparatus recited in the thirteenth aspect, furthermore, the timing for the operation initiation is determined in terms of an output of the electric motor, enabling the timing for the operation initiation to be easily determined.

With the control device for the vehicle power transmitting apparatus recited in the fourteenth aspect, moreover, the timing for the operation initiation is determined such that the greater the operating load, the faster will be the timing for the operation initiation. This allows the shifting to be executed over a long time, thereby minimizing fluctuation in, for instance, output torque.

With the control device for the vehicle power transmitting apparatus recited in the fifteenth aspect, besides, the timing for the operation initiation is determined such that the lower the temperature of working oil of the vehicle power transmitting apparatus, the faster will be the timing for the operation initiation. Accordingly, the presence of the low oil temperature results in the occurrence of deterioration in response of the hydraulic actuator. However, making the timing for the operation initiation faster enables a shifting time to be ensured, thereby minimizing the occurrence of such an adverse affect on degradation in response.

With the control device for the vehicle power transmitting apparatus recited in the sixteenth aspect, further, the timing for the operation initiation is determined such that the higher the temperature of working oil of the vehicle power transmitting apparatus, the faster will be the timing for the operation initiation. Accordingly, working oil tends to easily leak through a clearance present in the control valve for controlling the hydraulic pressure, resulting in degradation in response. However, making the timing for the operation initiation faster can minimize such an adverse affect.

With the control device for the vehicle power transmitting apparatus recited in the seventeenth aspect, furthermore, the timing for the operation initiation is determined such that the greater the speed ratio of the shifting portion, the faster will be the timing for the operation initiation. This enables executing the shifting over a long time, thereby enabling a reduction in fluctuation in, for instance, output torque.

With the control device for the vehicle power transmitting apparatus recited the eighteenth aspect, moreover, the timing for the operation initiation is determined such that the greater the step ratio of the shifting portion on a stage before and after the shifting, the faster will be the timing for the operation initiation. This enables the minimization in fluctuation in, for instance, output torque.

With the control device for the vehicle power transmitting apparatus recited in the nineteenth aspect, moreover, a speed ratio of the shifting portion is step variable. Although the shifting is executed in a stepwise fashion, appropriately determining the timing for the shifting operation can achieve an optimum shifting.

BEST MODE FOR CARRYING OUT THE INVENTION

Now, various embodiments of the present invention will be described below in detail with reference to accompanying drawings.

First Embodiment

Figures 1, 2:
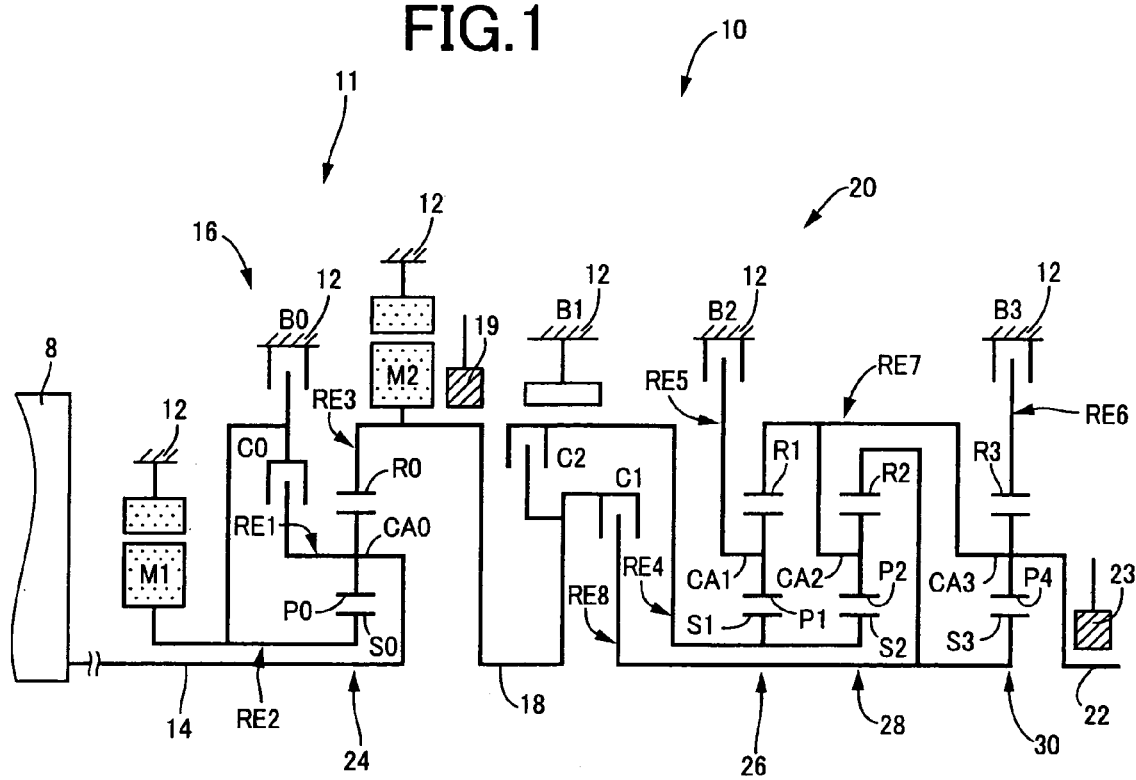
FIG. 1 is a skeleton view explaining a structure of a hybrid vehicle power transmitting apparatus of one embodiment according to the present invention.
FIG. 2 is an engagement operation table illustrating a combination in operations of a hydraulic-type frictional engaging device for use in a shifting operation of a drive apparatus shown in FIG. 1.

FIG. 1 is a skeleton view illustrating a shifting mechanism 10, forming part of a power transmitting apparatus for a hybrid vehicle, to which a control device according to the present invention is applied. As shown in FIG. 1, the shifting mechanism 10 includes an input shaft 14 disposed on a common axis to function as an input rotary member in a transmission case 12 (hereinafter referred to as a "case 12") mounted on a vehicle body as a non-rotary member, a differential portion 11 directly connected to the input shaft 14 or directly connected thereto through a pulsation absorbing damper (vibration damping device) not shown, an automatic shifting portion 20 connected to the differential portion 11 and drive wheels 38 (see FIG. 6) in series through a power transmitting path established therebetween via a power transmitting member (an output shaft of a differential portion) 18 and acting as a step-variable shifting portion, and an output shaft 22 connected to the automatic shifting portion 20 as an output rotary member, all of which are connected in series.

Figure 6:
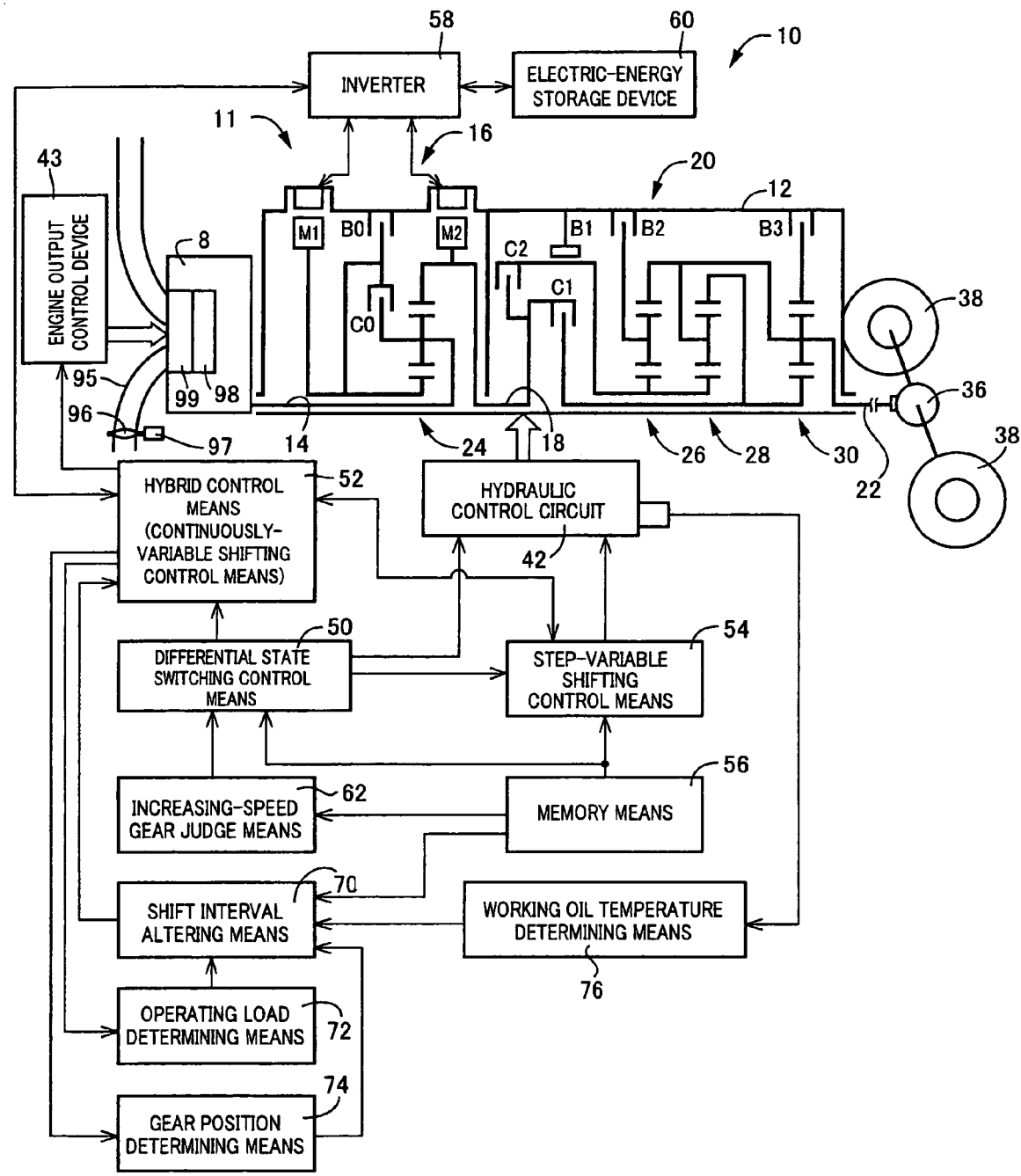
FIG. 6 is a functional block diagram illustrating a major control function to be executed by the electronic control device shown in FIG. 4.

The shifting mechanism 10, preferably applicable to an FR type (front-engine rear-drive type) vehicle, is mounted on the vehicle along a longitudinal axis thereof and connected between an engine 8, acting as a drive-force generating source such as, for instance, a gasoline engine or a diesel engine, etc., and serving as a running drive force source directly connected to the input shaft 14 or directly connected thereto via the pulsation absorbing damper, and a pair of drive wheels 38 (FIG. 6). This allows a vehicle drive force to be transmitted from the engine 8 to left and right drive wheels 38 in sequence through a differential gear device (final speed reduction gear) 36, forming a part of the power transmitting member, and a pair of drive axles. In addition, the engine 8 of the present embodiment refers to the drive force source of the present invention; the shifting mechanism 10 refers to the vehicle power transmitting device of the present invention; and the differential portion 11 refers to an electrically controlled differential portion. Moreover, the power transmitting member 18 allows an output shaft of the differential portion 11 and an input shaft of the automatic shifting portion 20 to be connected to each other, while acting as an output shaft of the differential portion 11 and an input shaft of the automatic shifting portion 20.

With the shifting mechanism 10 of the present embodiment, thus, the engine 8 and the differential portion 11 are held in direct connection with respect to each other. As used herein, the term "direct connection" may refer to a connection in which the engine 8 and the differential portion 11 are connected to each other with no intervening of a fluid-type power transmitting apparatus such as a torque converter or a fluid coupling or the like. The direct connection may involve a connection established with the use of the vibration damping device. Since the shifting mechanism 10 has a symmetric structure with respect to an axis of the shifting mechanism 10, a lower half is omitted from the skeleton view of FIG. 1.

The differential portion 11 can be said to be an electrically controlled differential portion in respect of an operation in which controlling an operating state of a first electric motor results in an effect of controlling a differential state. The differential portion 11 includes a first electric motor M1, and a power distributing mechanism 16 representing a mechanical mechanism for mechanically distributing an output of the engine 8 inputted to the input shaft 14 and acting as a differential mechanism for distributing the output of the engine 8 to the first electric motor M1 and the power transmitting member 18. Further, a second electric motor M2 is connected to the power transmitting member 18 to be unitarily rotatable therewith. Further, the first and second electric motors M1 and M2 act as so-called motor/generators having functions to generate electric power. The first electric motor M1 has at least a power generating function (for generating an electric power) to generate a reactive force, and the second electric motor M2 has at least a motor (electric motor) function to act as a drive force source to generate a drive force to run the vehicle.

The power distributing mechanism 16, corresponding to the differential mechanism of the present invention, mainly includes a differential-portion planetary gear unit 24 (corresponding to a differential gear of the present invention) of a single pinion type having a given speed ratio $\rho 0$ of, for instance, about "0.418", a switching clutch C0 and a switching brake B0. The differential-portion planetary gear unit 24 includes rotary elements (elements) such as a differential-portion sun gear S0, differential-portion planetary gears P0, a differential-portion carrier CA0 supporting the differential-portion planetary gears P0 such that these gears rotate about their axis and about the axis of the differential-portion sun gear S0, and a differential-portion ring gear R0 meshing with the differential-portion sun gear S0 via the differential-portion planetary gears P0. With the differential-portion sun gear S0 and the differential-portion ring gear R0 assigned to have the numbers of teeth represented by ZS0 and ZR0, respectively, the speed ratio $\rho 0$ is represented by ZS0/ZR0.

With the power distributing mechanism 16 of such a structure, the differential-portion carrier CA0 is connected to the input shaft 14, i.e., the engine 8; the differential-portion sun gear S0 is connected to the first electric motor M1; and the differential-portion ring gear R0 is connected to the power transmitting member 18. The switching brake B0 is connected between the differential-portion sun gear S0 and the casing 12, and the switching clutch C0 is connected between the differential-portion sun gear S0 and the differential-portion carrier CA0.

With both the switching clutch C0 and the switching brake B0 being disengaged, the power distributing mechanism 16 is rendered operative to take a differential state to allow the three elements of the differential-portion planetary gear unit 24, i.e., the differential-portion sun gear S0, the differential-portion carrier CA0 and the differential-portion ring gear R0 to rotate relative to each other, i.e., to operate in a differential action. This allows the output of the engine 8 to be distributed to the first electric motor M1 and the power transmitting member 18 with a part of the engine output distributed to the first electric motor M1 being used to generate electric energy for storage in a battery or to drivably rotate the second electric motor M2. Therefore, the differential portion 11 (power distributing mechanism 16) is rendered operative to act as an electrically controlled differential device such that the differential portion 11 is placed in, for instance, a so-called continuously variable shifting state (electrically controlled CVT state), under which the rotation speed of the power transmitting member 18 is caused to continuously vary, regardless of the engine 8 operating at a given rotation speed.

That is, controlling the operating state of the first electric motor M1 connected to the power distributing mechanism 16 in power transmissive state results in an effect of controlling a differential state between a rotation speed of the input shaft 14 connected to the engine 8, and a rotation speed of the power transmitting member 18 functioning as the output shaft. The rotation speed $N_{18}$ of the power transmitting member 18 is detected using a resolver 19 located in the vicinity of the second electric motor M2 for detecting a rotating direction thereof.

Under such a state, as the switching clutch C0 or the switching brake B0 is engaged, the power distributing mechanism 16 is rendered inoperative to fall in a non-differential state wherein no differential action is initiated, i.e., the differential action is limited. In particular, if the switching clutch C0 is engaged and the differential-portion sun gear S0 and the differential-portion carrier CA0 are unitarily coupled to each other, the power distributing mechanism 16 is placed in a locked state. Under such a state, all of the differential-portion sun gear S0, the differential-portion carrier CA0 and the differential-portion ring gear R0, serving as the three elements of the differential-portion planetary gear unit 24, are caused to rotate in a unitary rotation. This allows the power distributing mechanism 16 to be placed in the non-differential state under which no differential action is effectuated, causing the differential portion 11 to be also placed in a non-differential state.

Further, the rotation speeds of the engine 8 and the power transmitting member 18 are brought into coincidence to each other. Thus, the differential portion 11 (power distributing mechanism 16) is placed in a fixed shifting state, i.e., a step-variable shifting state to function as a transmission with the speed ratio $\gamma 0$ fixed to a value of "1". Subsequently, if in place of the switching clutch C0, the switching brake B0 is caused to engage to allow the differential-portion sun gear S0 to be connected to the casing 12, then, the power distributing mechanism 16 is placed in the locked state with the differential-portion sun gear S0 being placed in a non-rotary state. This causes the non-differential state to be established in which no differential action is initiated, causing the differential portion 11 to be also placed in the non-differential state. In addition, since the rotation speed of the differential-portion ring gear R0 is increased to be higher than that of the differential-portion carrier CA0, the power distributing mechanism 16 is rendered operative to function as a speed-increasing mechanism. Thus, the differential portion 11 (power distributing mechanism 16) is placed in the fixed shifting state, i.e., the step-variable shifting state to perform a function as a speed-increasing transmission with the speed ratio $\gamma 0$ being fixed to a value smaller than "1", i.e., a value of, for example, about "0.7".

With the present embodiment, thus, the switching clutch C0 and the switching brake B0 are caused to function as a shifting state switching device (a differential-action limiting mechanism) for selectively switching operating states of the differential portion 11 (power distributing mechanism 16). The operating states include the differential state, i.e., an unlocked state and the non-differential state, i.e., a locked state in which the differential portion 11 (power distributing mechanism 16) is placed in the differential state, i.e., a continuously variable shifting state operative to perform an electrically controlled continuously variable shifting operation in which the differential portion 11 actuates as a continuously variable transmission that can continuously vary, for instance, a shifting ratio; and the shifting state in which the differential portion 11 takes the shifting state with no electrically controlled continuously variable shifting operation being initiated, i.e., the locked state in which no continuously variable transmission is actuated and the continuously variable shifting operation is rendered inoperative with a fixed variation on a speed ratio.

Under such a locked state, the differential portion 11 is placed in a fixed shifting state (non-differential state) under which the differential portion 11 (power distributing mechanism 16) disenables the electrically controlled continuously variable shifting operation in which the differential portion 11 actuates as a single-stage or multiple-stage transmission providing one or two kinds of speed ratios. That is, under such a locked state, the electrically controlled continuously variable shifting operation is limited. In other words, the differential portion 11 is placed in the fixed shifting state in which the single-stage or multiple-stage transmission is rendered operative with a differential action of the differential portion 11 being limited to provide a fixed speed ratio.

The automatic shifting portion 20, forming part of the power transmitting path between the differential portion 11 and the drive wheels 38, includes a first planetary gear unit 26 of a single-pinion type, a second planetary gear unit 28 of a single-pinion type and a third planetary gear unit 30 of a single-pinion type. The first planetary gear unit 26 includes a first sun gear S1, first planetary gears P1, a first carrier CA1 supporting the first planetary gears P1 to rotate the first planetary gears P1 about their axes and about the axis of the first sun gear S1, and a first differential-portion ring gear R1 meshing with the first sun gear S1 via the first planetary gears P1, providing a given speed ratio $\rho 1$ of, for instance, about "0.562". The second planetary gear unit 28 includes a second sun gear S2, second planetary gears P2, a second carrier CA2 supporting the second planetary gears P2 to rotate the same about their axes and about the axis of the second sun gear S2, and a second ring gear R2 meshing with the second sun gear S2 via the second planetary gears P2, providing a given speed ratio $\rho 2$ of, for instance, about "0.425".

The third planetary gear unit 30 includes a third sun gear S3, third planetary gears P3, a third carrier CA3 supporting the third planetary gears P3 to rotate the same about their axes and about the axis of the third sun gear S3, and the third ring gear R3 meshing with the third sun gear S3 through the third planetary gears P3, providing a given speed ratio $\rho 3$ of, for instance, about "0.421". With the first sun gear S1, the first differential-portion ring gear R1, the second sun gear S2, the second ring gear R2, the third sun gear S3 and the third ring gear R3 assigned to have the numbers of teeth represented by ZS1, ZR1, ZS2, ZR2, ZS3 and ZR3, respectively, the speed ratios $\rho 1$, $\rho 2$ and $\rho 3$ are represented by ZS1/ZR1, ZS2/ZR2, and ZS3/ZR3, respectively. Also, the automatic shifting portion 20 corresponds to the shifting portion of the present invention.

With the automatic shifting portion 20, the first and second sun gears S1 and S2, unitarily connected to each other, are selectively connected to the power transmitting member 18 through a second clutch C2 while selectively connected to the casing 12 through a first brake B1. The first carrier CA1 is selectively connected to the casing 12 through a second brake B2 and the third ring gear R3 is selectively connected to the casing 12 through a third brake B3. The first ring gear R1, the second carrier CA2 and the third carrier CA3 are unitarily connected to each other, and the second ring gear R2 and the third sun gear S3 are unitarily connected to each other and selectively connected to the power transmitting member 18 through the first clutch C1.

Thus, the automatic shifting portion 20 and the power transmitting member 18 are selectively connected to each other via the first clutch C1 or the second clutch C2 used for establishing a gear shift position in the automatic shifting portion 20. In other words, the first and second clutches C1 and C2 collectively function as an engaging device for switching the operations of the power transmitting member 18 and the automatic shifting portion 20. That is, the power transmitting path between the transmitting member 18, functioning as the output shaft of the differential portion, and the automatic shifting portion 20, that is, between the differential portion 11 (the transmitting member 18) and the drive wheels 38 is switched between a power transfer enabling state enabling a power transfer through the power transmitting path, and a power transfer interrupting state interrupting the power transfer through the power transmission path. That is, upon engagement of at least one of the first and second clutches C1 and C2, the power transmitting path is placed in a power transfer enabling state. In contrast, upon disengagement of both the first and second clutches C1 and C2, the power transmitting path is placed in the power transfer interrupting state.

The switching clutch C0, the first and second clutches C1 and C2, the switching brake B0, the first and second brakes B1 and B2 and the third brake B3 are hydraulic-type frictionally coupling devices often used in a vehicular step-variable automatic transmission of the related art. Example of the frictionally coupling devices include a wet-type multiple-disc device, composed of a plurality of superposed friction plates pressed against each other with a hydraulic actuator, and a band brake comprised of a rotary drum having an outer circumferential surface on which one band or two bands are wound to be tightened at one end with a hydraulic actuator to allow associated component parts, between which the rotary drum intervenes, to be selectively connected to each other.

With the shifting mechanism 10 of such a structure set forth above, the switching clutch C0, the first and second clutches C1 and C2, the switching brake B0, the first and second brakes B1 and B2 and the third brake B3 are selectively engaged in operation as indicated on an engagement operation Table shown FIG. 2. This allows either one of a 1st-speed gear shift position (1st-speed gear shift position) to a 5th-speed gear shift position (5th-speed gear shift position) or one of a reverse-drive gear shift position (reverse-drive gear shift position) and a neural position to be selectively established. Thus, a speed ratio γ (input-shaft rotation speed $N_{IN}$/output-shaft rotation speed $N_{OUT}$) can be obtained for each gear shift position at a value varying in nearly equal ratio. In particular, with the present embodiment, the power distributing mechanism 16 is comprised of the switching clutch C0 and the switching brake B0, either one of which is engaged in operation. This enables the differential portion 11 to be placed in the continuously variable shifting state such that the differential portion 11 is rendered operative as the continuously variable transmission, while making it possible to provide the fixed shifting state rendering the differential portion 11 to operate as the transmission providing a fixed speed ratio.

Accordingly, the shifting mechanism 10 is established to assume the step-variable shifting state under which the shifting mechanism 10 actuates as the step-variable transmission with the differential portion 11 placed in the fixed shifting state upon engagement of either one of the switching clutch C0 and the switching brake B0, and the automatic shifting portion 20. In contrast, the shifting mechanism 10 is established to assume the continuously variable shifting state under which the shifting mechanism 10 is rendered operative as the electrically controlled continuously variable transmission with the differential portion 11 placed in the continuously variable shifting state upon disengagements of both the switching clutch C0 and the switching brake B0, and the automatic shifting portion 20. In other words, by causing either one of the switching clutch C0 and the switching brake B0 to engage in operation, the shifting mechanism 10 is switched to the step-variable shifting state, and disengaging both the switching clutch C0 and the switching brake B0 allows the shifting mechanism 10 to be placed in the continuously variable shifting state. Thus, it can be said that the differential portion 11 is operative as the transmission that can also be switched between the step-variable shifting state and the continuously variable shifting state. In addition, a rotation speed sensor 23 is mounted on the output shaft 22 to detect an output-shaft rotation speed $N_{OUT}$. The rotation speed sensor 23 is operative to detect not only the output-shaft rotation speed $N_{OUT}$ of the output shaft 22 but also a rotational direction thereof, capable of detecting a traveling direction of a vehicle.

For the shifting mechanism 10 rendered operative to function as, for instance, the step-variable transmission, the switching clutch C0, the first clutch C1 and the third brake B3 are caused to engage as shown in FIG. 2. This establishes a 1st-speed gear shift position with a speed ratio γ1 lying at a maximum value of, for instance, about "3.357". Upon engagements of the switching clutch C0, the first clutch C1 and the second brake B2, a 2nd-speed gear shift position a speed ratio γ2 lying at a value of, for instance, about "2.180", which is less than that of the 1st-speed gear shift position.

Upon engagements of the switching clutch C0, the first clutch C1 and the first brake B1, a 3rd-speed gear shift position is established with a speed ratio γ3 of, for instance, about "1.424", which is less than that of the 2nd-speed gear shift position. Upon engagements of the switching clutch C0, the first and second clutches C1 and C2, a 4th-speed gear shift position is established with a speed ratio γ4 of, for instance, about "1.000", which is less than that of the 3rd-speed gear shift position. Upon engagements of the first and second clutches C1 and C2 and the switching brake B0, a 5th-speed gear shift position is established with a speed ratio γ5 of, for example, about "0.705", which is less than that of the 4th-speed gear shift position. In addition, upon engagements of the second clutch C2 and the third brake B3, a reverse-drive gear shift position is established with a speed ratio γR of, for example, about "3.209". For a neutral "N" to be established, for instance, all of the clutches C0, C1 and C2 and the brakes, B0, B1, B2 and B3 are caused to disengage.

However, for the shifting mechanism 10 to function as the continuously variable transmission, both the switching clutch C0 and the switching brake B0 are disengaged as indicated in the engagement operation table shown in FIG. 2. With such operation, the differential portion 11 is rendered operative to function as the continuously variable transmission and the automatic shifting portion 20, connected thereto in series, is rendered operative to function as the step-variable transmission. This causes the automatic shifting portion 20 to establish the 1st-speed, 2nd-speed, 3rd-speed and 4th-speed gear shift positions, in each of which the rotation speed input to the automatic shifting portion 20, that is, the rotation speed of the power transmitting member 18 is caused to continuously vary. This allows each of the various gear shift positions to be established in a continuously variable shifting range. Accordingly, a speed ratio between the adjacent gear speed positions can be continuously varied, making it possible for the shifting mechanism 10 as a whole to obtain a continuously variable total speed ratio (overall speed ratio) γT.

Figure 3:
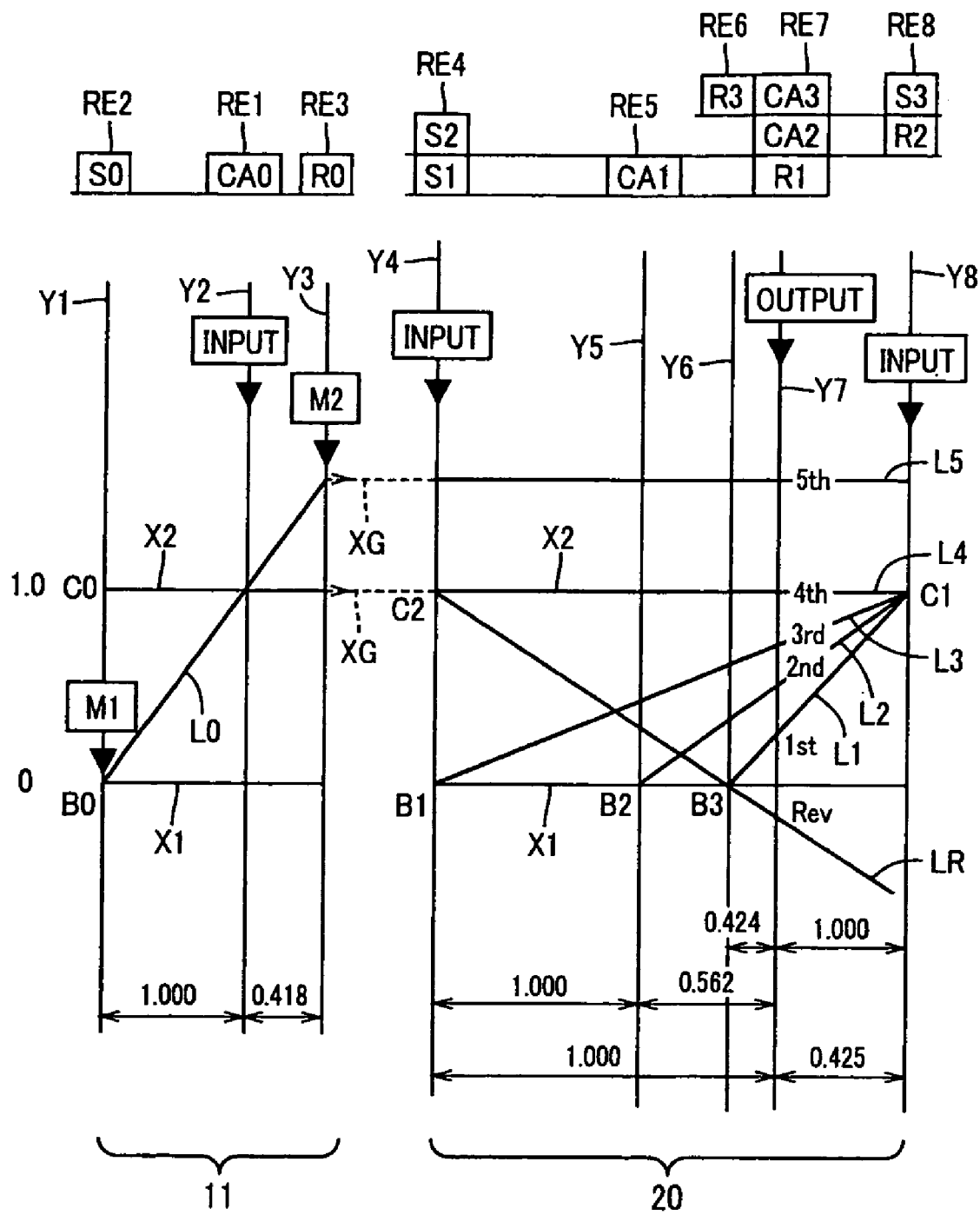
FIG. 3 is a collinear chart illustrating relative rotation speeds of rotary elements for respective gear shift positions in the drive apparatus shown in FIG. 1.

FIG. 3 shows a collinear chart plotted on linear lines that can represent correlations among the rotation speeds of the various rotary elements coupled in different states depending on the gear shift positions of the shifting mechanism 10 comprised of the differential portion 11, functioning as the continuously variable shifting portion, and the automatic shifting portion 20 functioning as the step-variable shifting portion. The collinear chart of FIG. 3 represents a two-dimensional coordinate system having the horizontal axis, representing the correlation among the speed ratios ρ established with the planetary gear units 24, 26, 28 and 30, and the vertical axis representing relative rotation speeds of the rotary elements. Among three horizontal lines, the lowermost line X1 designates the rotation speed lying at a value of "0". An upper horizontal line X2 indicates the rotation speed lying at a value of "1.0", that is, a rotation speed NE of the engine 8 connected to the input shaft 14. The uppermost horizontal line XG indicates the rotation speed of the power transmitting member 18.

Three vertical lines Y1, Y2 and Y3, corresponding to the three elements of the power distributing mechanism 16 forming the differential portion 11, represent relative rotation speeds of the differential-portion sun gear S0 corresponding to a second rotary element (second element) RE2, the differential-portion carrier CA0 corresponding to a first rotary element (first element) RE1, and the differential-portion ring gear R0 corresponding to a third rotary element (third element) RE3, respectively, as viewed from the left in sequence. An interval between adjacent vertical lines is determined depending on the speed ratio ρ0 of the differential-portion planetary gear unit 24.

Further, five vertical lines Y4, Y5, Y6, Y7 and Y8 for the automatic shifting portion 20 represents the rotation speeds of: the first and second sun gears S1 and S2 correspond to a fourth rotary element (fourth element) RE4 and connected to each other; the first carrier CA1 corresponding to a fifth rotary element (fifth element) RE5; the third ring gear R3 corresponding to a sixth rotary element (sixth element) RE6; the first ring gear R1, the second carrier CA2 and the third carrier and CA3 corresponding to a seventh rotary element (seventh element) RE7 and connected to each other; and the second ring gear R2 and the third sun gear S3 corresponding to an eighth rotary element (eighth element) RE8 and connected to each other, respectively. An interval between the adjacent vertical lines Y4 to Y8 is determined depending on the speed ratios ρ1, ρ2 and ρ3 of the first to third planetary gear units 26, 28 and 30.

For the relationship between the vertical lines on the collinear chart, if the interval between the sun gear and the carrier is assigned to have a distance corresponding to a value of "1", then an interval between the carrier and the ring gear is assigned to have a distance corresponding to the speed ratio ρ of the planetary gear unit. That is, for the differential portion 11, an interval between the vertical lines Y1 and Y2 is assigned to have a distance corresponding to a value of "1" and an interval between the vertical lines Y2 and Y3 is assigned to have a distance corresponding to a value of "□0". For the automatic shifting portion 20, further, an interval between the sun gear and the carrier is determined to have a distance corresponding to a value of "1" and an interval between the carrier and the ring gear is determined to have a distance corresponding to the speed ratio □ for each of the first to third planetary gear units 26, 28 and 30.

To express the structure with the use of the collinear chart shown in FIG. 3, the shifting mechanism 10 of the present embodiment includes the power distributing mechanism 16 (continuously variable shifting portion 11) arranged in such a structure described below. That is, the first rotary element RE1 (differential-portion carrier CA0) of the differential-portion planetary gear unit 24 is connected to the input shaft 14, i.e., the engine 8, and selectively connected to the second rotary element (differential-portion sun gear S0) RE2 through the switching clutch C0. The second rotary element RE2 is connected to the first electric motor M1 and selectively connected to the casing 12 through the switching brake B0. The third rotary element RE3 (differential-portion ring gear R0) is connected to the power transmitting member 18 and the second electric motor M2. The rotation of the input shaft 14 is transferred (input) to the automatic shifting portion (step-variable shifting portion) 20 via the power transmitting member 18. A diagonal linear line L0, passing across an intersecting point between the lines Y2 and X2, represents the correlation between the rotation speed of the differential-portion sun gear S0 and the rotation speed of the differential-portion ring gear R0.

For instance, as the switching clutch C0 and the switching brake B0 are disengaged, the shifting mechanism 10 is switched to the continuously variable shifting state (differential state). In this case, controlling the rotation speed of the first electric motor M1 causes the rotation speed of the differential-portion sun gear S0, represented by an intersecting point between the linear line L0 and the vertical line Y1, to increase or decrease. Under such a state, if the rotation speed of the differential-portion ring gear R0, bound with a vehicle speed V, is kept at a nearly fixed level, then, the rotation speed of the differential-portion carrier CA0, represented by an intersecting point between the linear line L0 and the vertical line Y2, is caused to increase or decrease.

Further, if the switching clutch C0 is caused to engage, then, the differential-portion sun gear S0 and the differential-portion carrier CA0 are connected to each other. Then, the power distributing mechanism 16 is brought into the non-differential state with the three rotary elements being caused to rotate in unitary motion. In this case, the linear line L0 matches the lateral line X2, causing the power transmitting member 18 to rotate at the same rotation speed as the engine rotation speed NE. Alternatively, if the switching brake B0 is caused to engage, then, the differential-portion sun gear S0 is caused to halt in rotation. This causes the power distributing mechanism 16 to be brought into the non-differential state to function as a speed increasing mechanism. In this event, the linear line L0 lies in a state shown in FIG. 3. Under such a state, the rotation of the differential-portion ring gear R0, i.e., the rotation of the power transmitting member 18, represented by an intersecting point between the linear line L0 and the vertical line Y3, is input to the automatic shifting portion 20 at an increasing speed higher than engine rotation speed NE.

With the automatic shifting portion 20, further, the fourth rotary element RE4 is selectively connected to the power transmitting member 18 through the second clutch C2 and selectively connected to the casing 12 through the first brake B1. The fifth rotary element RE5 is selectively connected to the casing 12 through the second brake B2 and the sixth rotary element RE6 is selectively connected to the casing 12 through the third brake B3. The seventh rotary element RE7 is connected to the output shaft 22 and the eighth rotary element RE8 is selectively connected to the power transmitting member 18 through the first clutch C1.

With the automatic shifting portion 20, the first clutch C1 and the third brake B3 are caused to engage as shown in FIG. 3. In this event, a diagonal linear line L1 passes across an intersecting point between the vertical line Y8, representing the rotation speed of the eighth rotary element RE8, and the horizontal line X2 and an intersecting point between the vertical line Y6, representing the rotation speed of the sixth rotary element RE6, and the horizontal line X1. The diagonal linear line L1 intersects an intersecting point between the vertical line Y7, representing the rotation speed of the seventh rotary element RE7 connected to the output shaft 22, at an intersecting point that represents the rotation speed of the output shaft 22 for the 1st-speed gear shift position.

Likewise, a diagonal linear line L2 is determined upon engagements of the first clutch C1 and the second brake B2. The diagonal linear line L2 intersects the vertical line Y7, representing the rotation speed of the seventh rotary element RE7 connected to the output shaft 22, at an intersecting point representing the rotation speed of the output shaft 22 for the 2nd-speed gear shift position. A diagonal linear line L3 is determined upon engagements of the first clutch C1 and the first brake B1. The diagonal linear line L3 intersects the vertical line Y7, representing the rotation speed of the seventh rotary element RE7 connected to the output shaft 22, at an intersecting point representing the rotation speed of the output shaft 22 for the 3rd-speed gear shift position. A horizontal linear line L4 is determined upon engagements of the first and second clutches C1 and C2 intersects the vertical line Y7, representing the rotation speed of the seventh rotary element RE7 connected to the output shaft 22, at an intersecting point representing the rotation speed of the output shaft 22 for the 4th-speed gear shift position.

For the 1st-speed to 4th-speed gear shift positions, the switching clutch C0 remains engaged. As a result, the differential portion 11, i.e., the power distributing mechanism 16 delivers a drive force that is applied to the eighth rotary element RE8 at the same rotation speed as the engine rotation speed NE. However, in place of the switching clutch C0, if the switching clutch B0 is caused to engage, then, the drive force is applied from the differential portion 11 to the eighth rotary element RE8 at a higher rotation speed to the engine rotation speed NE. Thus, a horizontal linear line L5 is determined upon engagements of the first and second clutches C1 and C2 and the switching clutch B0. The horizontal line L5 intersects the vertical line Y7, representing the rotation speed of the seventh rotary element RE7 connected to the output shaft 22, at an intersecting point representing the rotation speed of the output shaft 22 for the 5th-speed gear shift position.

Figure 4:
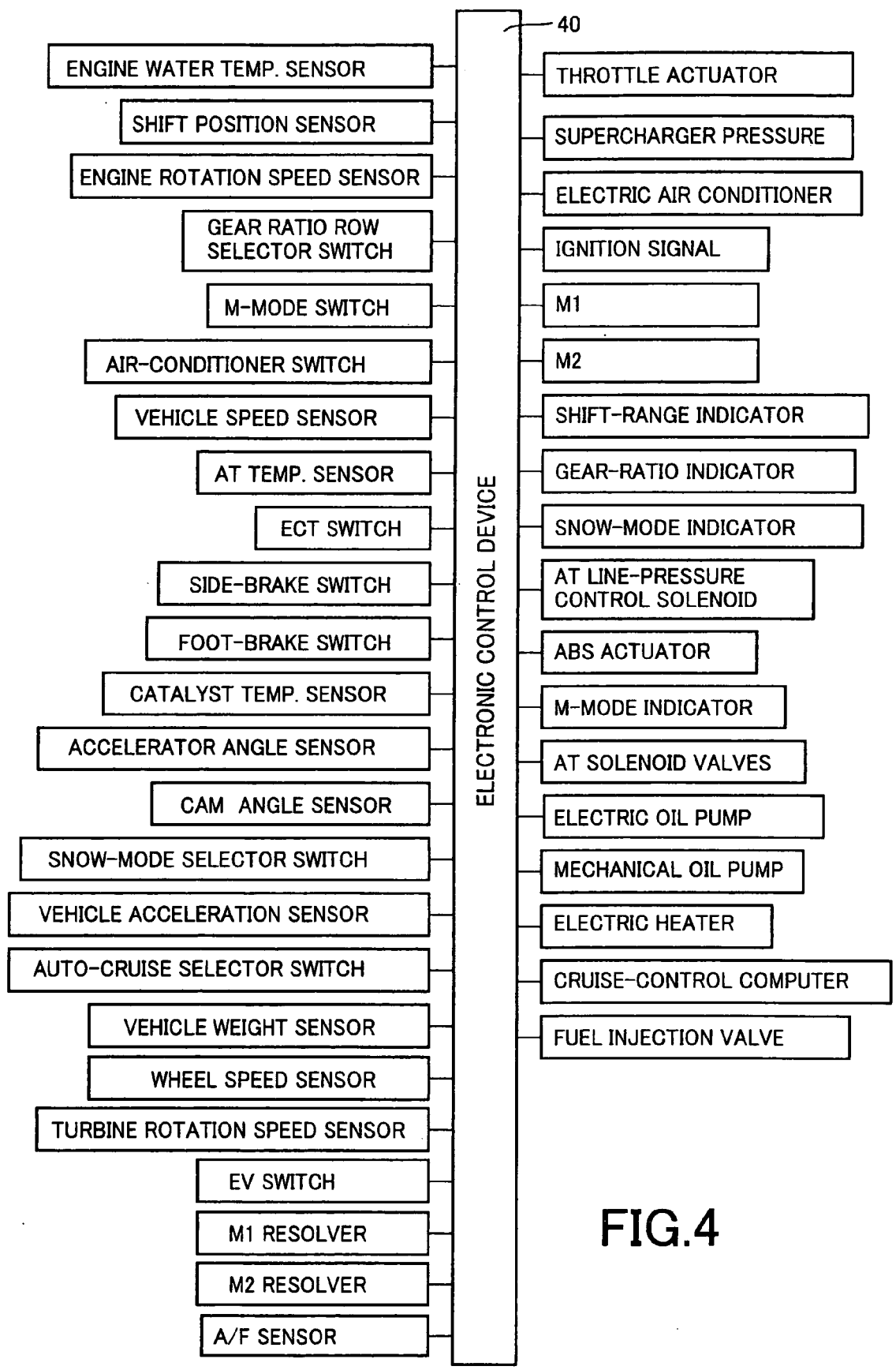
FIG. 4 is a view illustrating input and output signals to be input to or output from an electronic control device incorporated in the drive apparatus shown in FIG. 1.

FIG. 4 exemplarily shows various signals input to an electronic control device 40, serving as a control device for controlling the shifting mechanism 10 forming part of the hybrid vehicle power transmitting apparatus according to the present invention, and various signals output from the electronic control device 40. The electronic control device 40 includes a so-called microcomputer incorporating a CPU, a ROM, a RAM and an input/output interface. With the signals processed in operation in accordance with programs preliminarily stored in the ROM while utilizing a temporarily data storing function of the ROM, drive controls are executed for performing hybrid drive controls, related to the engine 8 and the first and second electric motors M1 and M2, and a shifting control for the automatic shifting portion 20.

The electronic control device 40 is applied with the input signals from various sensors and switches shown in FIG. 4. These input signals include: a signal indicative of an engine cooling water temperature $TEMP_W$; a signal indicative of a selected shift position $P_{SH}$; a signal indicative of a rotation speed $N_{M1}$ of the first electric motor M1; a signal indicative of a rotation speed $N_{M2}$ of the second electric motor M2; a signal indicative of the engine rotation speed NE representing the rotation speed of the engine 8; a signal indicative of a speed ratio row setting value; a signal commanding an "M" mode (manually shift drive mode); an air-conditioning signal indicative of a turn-on operation of an air conditioner; a signal indicative of the vehicle speed V and a rotational direction corresponding to the rotation speed $N_{OUT}$ of the output shaft 22.

Also applied are a working oil temperature signal indicative of a working oil temperature in the automatic shifting portion 20; a signal indicative of a side brake being operated; a signal indicative of a foot brake being operated; a catalyst temperature signal indicative of a temperature of a catalyst; an accelerator opening signal indicative of a depressed value $A_{CC}$ of an accelerator pedal corresponding to an output demand value required by a driver; a cam angle signal; a snow mode setting signal indicative of a snow mode being set; an acceleration signal indicative of an acceleration of the vehicle in a fore and aft direction thereof; an auto-cruising signal indicative of the running under an auto-cruising mode; a vehicle weight signal indicative of a weight of the vehicle; a drive wheel velocity signal indicative of a wheel velocity of each drive wheel; a signal indicative of an air-fuel ratio A/F of the engine 8; and a signal indicative of a throttle valve opening $\theta_{TH}$, etc.

Further, the electronic control device 40 outputs various signals including control signals applied to an engine output control device 43 (see FIG. 6) for controlling an engine output. These control signals include, for instance: a drive signal to be applied to a throttle actuator 97 for controlling an opening degree $\theta_{TH}$ of an electronic throttle valve 96 disposed in an intake manifold 95 of the engine 8; a fuel supply quantity signal to be applied to a fuel injection device 98 for controlling the amount to fuel to be supplied to each cylinder of the engine 8; an initiation signal to be applied to an initiation device 99 for commanding an initiation timing of the engine 8; a supercharger pressure regulating signal for adjusting a supercharger pressure level; an electric air-conditioner drive signal for actuating an electric air conditioner; command signals for commanding the first and second electric motors M1 and M2 to be operated; a shift-position (selected shift position) display signal for actuating a shift indicator.

Also outputted are a speed ratio display signal for providing a display of the speed ratio; a snow-mode display signal for providing a display of a snow mode under operation; an ABS actuation signal for actuating an ABS actuator for preventing slippages of the drive wheels during a braking operation; an M-mode display signal for displaying the M-mode being selected; valve command signals for actuating electromagnetic valves incorporated in a hydraulically operated control circuit 42 (see FIG. 6) to control hydraulic actuators of the hydraulically operated frictional engaging devices of the differential portion 11 and the automatic shifting portion 20; drive command signals for actuating an electrically actuated hydraulic pressure pump serving as a hydraulic pressure source of the hydraulically operated control circuit 42; and a signal to be applied to a cruise-control computer, etc.

Figure 5:
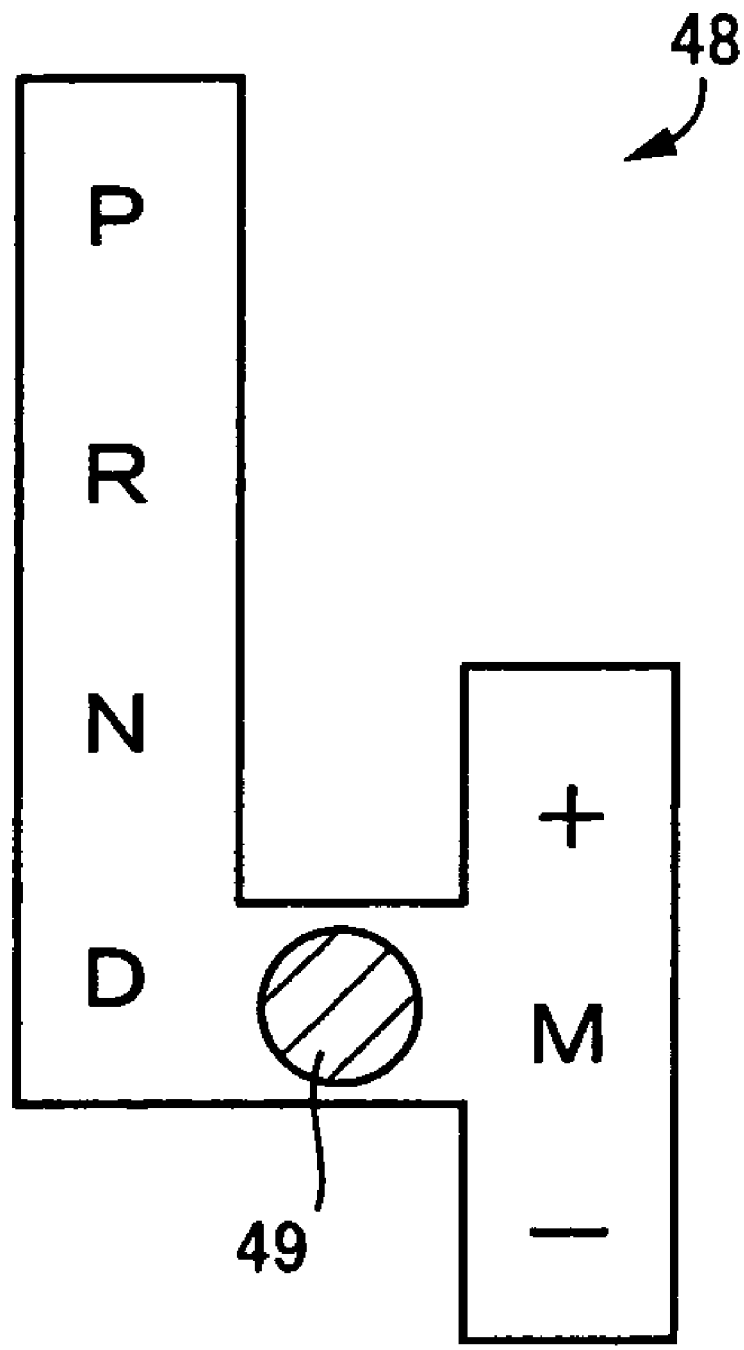
FIG. 5 is a view showing one sample of a shift operating device provided with a shift lever to select one of plural kinds of shift positions.

FIG. 5 is a view showing one sample of a shift operating device 48, serving as a switching device, which is manually shifted to select one of a plurality of kinds of shift positions $P_{SH}$. The shift operating device 48 includes a shift lever 49 mounted aside, for example, a driver's seat to be manually shifted to select one of the plural kinds of the gear shift positions.

The shift lever 49 is arranged in structure manually shifted to select: a parking position "P" (Parking) under which the shifting mechanism 10, i.e., the power transmitting path of the shifting mechanism 10, is placed in a neutral state, i.e., a neutral condition in which the output shaft 22 of the automatic shifting portion 20 is locked; a reverse drive running position "R" (Reverse) for a vehicle to run in a reverse drive mode; a neutral position "N" (Neutral) for a neutral state to be established with the power transmitting path being interrupted in the shifting mechanism 10; a forward drive automatic shift position "D" (Drive) for an automatic shift control to be executed within a range of varying the total speed ratio γT that can be shifted in the shifting mechanism 10; or a forward drive manual shift position "M" (Manual) for establishing manual shift running mode (manual mode) for thereby setting a so-called shift range in which gear shift positions are limited in a high speed range during the execution of the automatic shift control.

The shift lever 49 is manually shifted to each of the shift positions SP and, in conjunction therewith, for instance, the hydraulic control circuit 42 is electrically switched to establish each of the gear shift positions such as the reverse drive position "R", the neutral position "N" and the forward drive position "D" shown in the engagement operation table shown in FIG. 2.

Among the various shift positions PS indicated by the "P" to "M" positions, the "P" and "N" positions represent non-running positions selected when no attempt is made to run the vehicle. That is, both the first and second clutches C1 and C2 are caused to disengage as shown in, for example, the engagement operation table of FIG. 2. This causes the first and second clutches C1 and C2 to place the power transmitting path in the power transfer interrupting state for selecting non-drive positions under which the power transmitting path of the automatic shifting portion 20 is interrupted to disenable the vehicle from being driven. Further, the "R", "D" and "M" positions represent running positions selected when an attempt is made to run the vehicle. That is, these shift positions represent drive positions for causing the first and/or second clutches C1 and C2 to switch the power transmitting path to the power transfer enabling state. Under such a state, at least one of the first and second clutches C1 and C2 is caused to engage as shown in, for instance, the engagement operation table of FIG. 2 to connect the power transmitting path of the automatic shifting portion 20 for enabling the vehicle to be driven.

More particularly, with the shift lever 49 manually shifted from the "P" position or the "N" position to the "R" position, the second clutch C2 is caused to engage so that the power transmitting path of the automatic shifting portion 20 is switched from the power transfer interrupting state to the power transfer enabling state. With the shift lever 49 manually shifted by a driver from the "N" position to the "D" position, at least the first clutch C1 is switched from a disengaging state to an engaging state, causing the power transmitting path of the automatic shifting portion 20 to be switched from the power transfer interrupting state to the power transfer enabling state. Further, with the shift lever 49 manually shifted from the "R" position to the "P" position or the "N" position, the second clutch C2 is caused to disengage and the power transmitting path of the automatic shifting portion 20 is switched from the power transfer enabling state to the power transfer interrupting state. With the shift lever 49 manually shifted by the driver from the "D" position to the "N" position, the first and second clutches C1 and C2 are switched from engaging states to the disengaging states and the power transmitting path of the automatic shifting portion 20 is switched from the power transfer enabling state to the power transfer interrupting state.

FIG. 6 is a functional block diagram illustrating an essential part of a control function to be executed with the electronic control device 40. In FIG. 6, step-variable shift control means 54 functions as shift control means for executing the shifting in the automatic shifting portion 20. For instance, the step-variable shift control means 54 makes a query as to whether the shifting is executed in the automatic shifting portion 20 based on a vehicle condition represented by the vehicle speed V and demanded output torque $T_{OUT}$ required for the automatic shifting portion 20. This is made by referring to the relationships (including the shifting diagram and the shifting map), preliminarily stored in memory means 56, which are plotted in solid lines and single dot lines in FIG. 7. That is, the operation is execute to discriminate a gear shift position to be established in the automatic shifting portion 20 and the automatic shifting portion 20 executes the shifting so as to obtain the discriminated gear shift position. During such operation, the step-variable shift control means 54 outputs a command (gear shift output command) to the hydraulic control circuit 42 for causing the hydraulically operated frictional engaging devices, excepting the switching clutch C0 and the switching brake B0, to engage and/or disengage so as to establish a desired gear shift position in accordance with, for instance, the engagement operation table shown in FIG. 2.

Hybrid control means 52 renders the engine 8 operative in an operating range at high efficiency under the continuously variable shifting state of the shifting mechanism 10, i.e., the differential state of the differential portion 11. On the other hand, the hybrid control means 52 allows drive forces of the engine 8 and the second electric motor M2 to be distributed while causing the first electric motor M1 to generate electric power at optimum varying rates, thereby controlling the speed ratio $\gamma 0$ of the electrically controlled continuously variable transmission placed with the differential portion 11. To this end, the hybrid control means 52 performs various calculating operations at a current running vehicle speed. These calculating operations include, for instance; an operation to calculate a target (demanded) output of the vehicle by referring to an accelerator pedal depressing stroke Acc and the vehicle speed V both of which collectively represent an output demand value desired by the driver; an operation to calculate a demanded total target output by referring to the target output of the vehicle and a charging request value of the battery; and an operation to calculate a target engine output in light of a transfer loss, loads on auxiliary units and torque assisted with the second electric motor M2, etc., so as to achieve the total target output. Thus, the hybrid control means 52 controls the engine 8 while controlling an electric power generating rate of the first electric motor M1 so as to provide the engine rotation speed NE and engine torque TE such that the target engine output is obtained.

The hybrid control means 52 executes a control in light of the gear shift position of the automatic shifting portion 20 with a view to achieving power performance and improved fuel consumption. During such a hybrid control, the differential portion 11 is rendered operative to function as the electrically controlled continuously variable transmission. This is achieved for causing the engine rotation speed NE and the vehicle speed V, determined for the engine 8 to operate at high efficiency, and the rotation speed of the power transmitting member 18, determined with the selected gear shift position of the automatic shifting portion 20 to match each other. That is, the hybrid control means 52 preliminarily stores therein an optimum fuel economy curve (including a fuel economy map and relevant relationship) of the engine 8.

This curve is preliminarily determined on an experimental basis on a two-dimensional coordinate, having parameters of, for instance, the engine rotation speed NE and output torque (engine torque) TE of the engine 8, for the vehicle to achieve a balance between drivability and fuel economy performance during the running of the vehicle under the continuously variable shifting state. In order for the engine 8 to operate on such an optimum fuel economy curve, a target value on the total speed ratio $\gamma T$ of the shifting mechanism 10 is determined so as to obtain engine torque TE and the engine rotation speed NE for the demanded engine output to be generated so as to meet, for instance, the target output (total target output and demanded drive force). To obtain such a target value, the hybrid control means 52 controls the speed ratio $\gamma 0$ of the differential portion 11 such that the total speed ratio $\gamma T$ is controlled within a shiftable varying range of, for instance, 13 to 0.5.

During such hybrid control, the hybrid control means 52 allows electric energy generated by the first electric motor M1 to be supplied to a battery 60 and the second electric motor M2 through an inverter 58. Thus, a major part of the drive force delivered from the engine 8 is mechanically transferred to the power transmitting member 18 and the rest of the drive force of the engine 8 is delivered to the first electric motor M1 to be consumed for conversion to electric power. The resulting electric energy is supplied through the inverter 58 to the second electric motor M2, which in turn is driven to provide a drive force for delivery to the power transmitting member 18. Equipments, involved in phases for electric energy to be generated and the second electric motor M2 to consume electric energy, establish an electric path starting from one phase in which the part of the drive force of the engine 8 is converted into electric energy to the other phase in which electric energy is converted to mechanical energy.

The hybrid control means 52 functionally includes engine output control means for executing an output control of the engine 8. This is achieved by causing the throttle actuator 97 to perform a throttle control so as to controllably open or close the electronic throttle valve 96. In addition, a fuel injection device 98 is operated to control a fuel injection quantity and fuel injection timing for performing a fuel injection control. Further, commands are output in a single mode or in a combination to an engine output control unit 43 to allow an initiation device 99, such as an igniter or the like, to control an initiation timing for such an initiation timing control. This allows the engine 8 to execute the output control so as to generate the demanded engine output. For instance, the hybrid control means 52 drives the throttle actuator 97 in response to the accelerator opening signal Acc by fundamentally referring to the preliminarily stored relationship, not shown, so as to execute the throttle control such that the greater the accelerator opening Acc, the greater will be the throttle valve opening $\theta_{TH}$.

Figure 7:
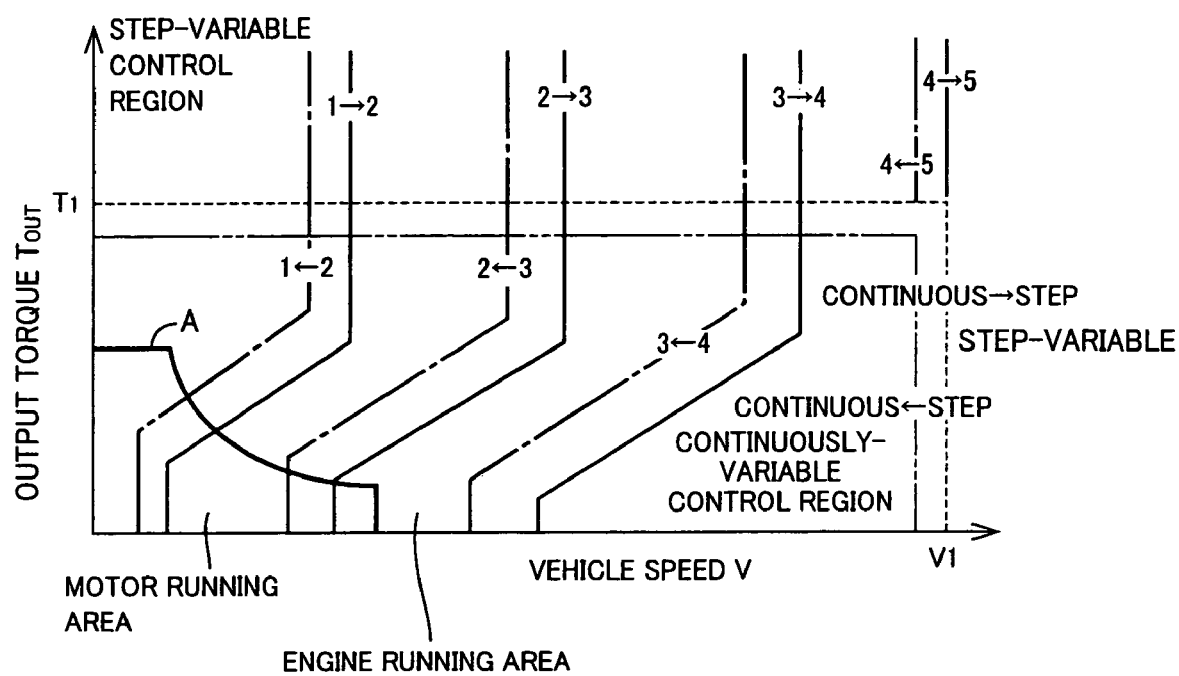
FIG. 7 is a view, representing one example of a shifting map for use in the shifting control of the drive apparatus and one example of a drive-force source map for use in control of switching a drive force source to select an engine drive mode and a motor drive mode, which also represents the relationship between those examples.

A solid line A, shown in FIG. 7, represents a boundary line between an engine drive region and a motor drive region. This is used for causing the vehicle to start up and run (hereinafter referred to as "run") with a drive force source switched between the engine 8 and an electric motor, i.e., for instance, the second electric motor M2. In addition, the boundary line is used for performing the switching between a so-called engine drive mode, in which the engine 8 is used as the drive force source for the vehicle to start up and run (hereinafter referred to as "run"), and a so-called motor drive mode in which the second electric motor M2 is used as the drive force source for running the vehicle. The preliminarily stored relationship, having the boundary line (in the solid line A) shown in FIG. 7 for the engine drive region and the motor drive region to be switched, represents one example of a drive-force source switching diagram (drive force source map), formed on a two-dimensional coordinate, which includes parameters such as the vehicle speed V and output torque $T_{OUT}$ representing a drive-force correlation value. The drive-force source switching diagram is preliminarily stored with the shifting diagram (shifting map) designated by, for instance, solid lines and single dot lines in FIG. 7.

The hybrid control means 52 determines which of the motor drive region and the engine drive region is to be selected based on the vehicle condition, represented by the vehicle speed V and demanded torque output $T_{OUT}$ by referring to, for instance, the drive-force source switching diagram shown in FIG. 7, thereby executing the motor drive mode or the engine drive mode. Thus, the hybrid control means 52 executes the motor drive mode at relatively low output torque $T_{OUT}$, i.e., low engine torque $T_E$, at which an engine efficiency is generally regarded to be lower than that involved in a high torque region, or a relatively low vehicle speed range of the vehicle speed V, i.e., under a low load region as will be apparent from FIG. 7.

During such a motor drive mode, the hybrid control means 52 allows the differential portion to perform an electrical CVT function (differential function) for controlling the first-motor rotation speed $N_{M1}$ at a negative rotation speed, i.e., at an idling speed to cause the differential portion 11 to initiate the differential action. This causes the engine rotation speed NE to be maintained at a zeroed or nearly zeroed level, thereby minimizing a drag of the engine 8, remained under a halted state, for providing improved fuel economy.

Further, even if the engine drive region is present, the hybrid control means 52 allows the electrical path to supply electric energy, from the first electric motor M1, and/or electric energy, output from the battery 60, to the second electric motor M2. This drives the second electric motor M2, thereby making it possible to perform torque assist operation to assist the power of the engine 8. Therefore, the term "engine drive mode" used in this embodiment may include a phase involving the engine drive mode and the motor drive mode.

Furthermore, the hybrid control means 52 enables the differential portion 11 to perform the electrical CVT so as to maintain the operating state of the engine 8 regardless of a halted state or a low vehicle speed condition of the vehicle. For instance, there is a likelihood that a drop occurs in a state of charge SOC of the battery 60 with a resultant need for the first electric motor M1 to generate electric power. Under such a state, the power of the engine 8 is applied to the first electric motor M1, which is driven to generate electric power with an increase in rotation speed $N_{M1}$ of the first electric motor M1. Thus, even if the rotation speed $N_{M2}$ of the second electric motor M2, uniquely determined with the vehicle speed V, is zeroed (nearly zeroed) due to the vehicle halt condition, the power distributing mechanism 16 performs the differential action to maintain the engine rotation speed NE at a value above a rotation speed that can be autonomously achieved.

Moreover, the hybrid control means 52 allows the differential portion 11 to perform the electrical CVT function to control the rotation speed $N_{M1}$ of the first electric motor M2 and/or the rotation speed $N_{M2}$ of the second electric motor M2 so as to maintain the engine rotation speed NE at an arbitrary rotation speed. As will be understood from the collinear chart shown in FIG. 3, for instance, when raising the engine rotation speed NE, the hybrid control means 52 executes the operation to raise the rotation speed $N_{M1}$ of the first electric motor M1 while permitting the rotation speed $N_{M2}$ of the second electric motor M2, bound with the vehicle speed V, to be kept at a nearly constant level.

When causing the shifting mechanism 10 to be placed in the step-variable shifting state, increasing-speed gear position determining means 62 determines which of the switching clutch C0 and the switching brake B0 is to be caused to engage. To this end, the increasing-speed gear position determining means 62 executes the operation in accordance with the shifting diagram, shown in FIG. 7, which is preliminarily stored in the storage means 56 on the basis of, for instance, the vehicle condition, thereby making determination as to whether the gear shift position to be shifted in the shifting mechanism 10 lies in an increasing-speed gear position such as, for instance, a 5th-speed gear position.

Switching control means 50 switches the engaging and/or disengaging states of the differential-state switching means (switching clutch C0 and switching brake B0) based on the vehicle condition, thereby selectively executing a switchover between the continuously variable shifting state and the step-variable shifting state, i.e., between the differential state and the locked state. For instance, the switching control means 50 executes the operation based on the vehicle condition, represented with the vehicle speed V and demanded output torque $T_{OUT}$, by referring to the relationships (shifting diagram and shifting map), shown in the broken lines and the double dot lines in FIG. 7 and preliminarily stored in the memory means 56 to determine whether to switch the shifting state of the shifting mechanism 10 (differential portion 11). That is, the determination is made as to whether a continuously variable control region for the shifting mechanism 10 to be placed in the continuously variable shifting state or a step-variable control region for the shifting mechanism 10 to be placed in the step-variable shifting state is present. This allows the operation to be executed for determining the shifting state to be switched in the shifting mechanism 10, thereby executing the operation to selectively switch the shifting state to one of the continuously variable shifting state and the step-variable shifting state.

More particularly, if the determination is made that the shifting mechanism 10 lies in the step-variable shifting control region, then, the switching control means 50 outputs a signal to the hybrid control means 52 for disenabling or interrupting the supply of the hybrid control or the continuously variable shifting control, while permitting the step-variable shift control means 54 to perform the shifting for the step-variable shifting operation that has been preliminarily determined. When this takes place, the step-variable shift control means 54 allows the automatic shifting portion 20 to perform the automatic shifting in accordance with, for instance, the shifting diagram shown in FIG. 7 and preliminarily stored in the memory means 56. For instance, the engagement operation table, shown in FIG. 2 and preliminarily stored in the memory means 56, represents the operations in combination of the hydraulically operated frictional engaging devices, that is, the clutches C0, C1 and C2 and the brakes B0, B1, B2 and B3 to be selected in such a shifting operation. That is, a whole of the shifting mechanism 10, i.e., the differential portion 11 and the automatic shifting portion 20, functions as a so-called step-variable automatic transmission, thereby establishing the gear shift positions according to the engagement operation table shown in FIG. 2.

For instance, if the increasing-speed gear position determining means 62 determines that the 5th-gear shift position is to be selected, the shifting mechanism 10 can obtain an increasing-speed gear position, i.e. a so-called overdrive gear position as a whole with a speed ratio less than "1.0". To this end, the switching control means 50 outputs commands to the hydraulic control circuit 42 for disengaging the switching clutch C0 while engaging the switching brake B0 to allow the differential portion 11 to function as a subsidiary power transmission with a fixed speed ratio □0, i.e., for instance, the speed ratio □0 equal to "0.7". Further, when the increasing-speed gear position determining means 62 determines that no 5th-gear shift position is to be selected, the shifting mechanism 10 can obtain a decreasing-speed gear position with a speed ratio of "1.0" or more. To this end, the switching control means 50 outputs other commands to the hydraulic control circuit 42 for engaging the switching clutch C0 while disengaging the switching brake B0 to allow the differential portion 11 to function as the subsidiary power transmission with the fixed speed ratio □0, i.e., for instance, the speed ratio □0 equal to "1". Thus, the switching control means 50 causes the shifting mechanism 10 to be switched in the step-variable shifting state under which the operation is executed to selectively switch the gear shift positions of two kinds to either one gear shift position. This allows the differential portion 11 to function as the subsidiary power transmission while causing the automatic shifting portion 20, connected to the differential portion 11 in series, to function as the step-variable transmission such that the shifting mechanism 10 as a whole is rendered operative to function as the so-called step-variable automatic transmission.

On the contrary, if the switching control means 50 determines that the shifting mechanism 10 remains in the continuously variable shifting control region to be switched in the continuously variable shifting state, the switching control means 50 outputs commands to the hydraulic control circuit 42 for disengaging both the switching clutch C0 and the switching brake B0. This causes the differential portion 11 to be placed in the continuously variable shifting state to enable a continuously variable shifting operation such that the shifting mechanism 10 as a whole establishes a continuously variable shifting state. Simultaneously, the switching control means 50 outputs a signal to the hybrid control means 52 for the hybrid control to be executed. The switching control means 50 outputs a signal to the step-variable shift control means 54 for a gear position to be fixed to that of a predetermined continuously variable shifting state while outputting a signal to the step-variable shift control means 54 to cause the automatic shifting portion 20 to perform the automatic shifting operation according to, for instance, the shifting diagram shown in FIG. 7. In this case, the step-variable shift control means 54 performs the automatic shifting operation upon executing the operation excepting the operations to engage the switching clutch C0 and the switching brake B0 in the engagement operation table shown in FIG. 2.

Thus, the switching control means 50 allows the continuously variable shifting state to be switched to cause the differential portion 11 to function as the continuously variable transmission whereas the automatic shifting portion 20, connected to the differential portion 11 in series, is caused to function as the step-variable transmission. This allows a drive force to be obtained with an appropriate magnitude. Simultaneously, the rotation speed input to the automatic shifting portion 20, i.e., the rotation speed of the power transmitting member 18, is caused to continuously vary for each of the gear positions for the 1st-speed to 4th-speed of the automatic shifting portion 20, enabling each gear position to be obtained in a continuously variable speed ratio range. Accordingly, a speed ratio between the adjacent gear positions can be continuously variable in a continuously variable manner. This allows the shifting mechanism 10 as a whole to obtain the overall speed ratio γT in a continuously variable mode.

Here, the operation will be will be described more in detail with reference to FIG. 7. FIG. 7 represents the relationships (shifting diagram and shifting map), preliminarily stored in the memory means 56 and acting as a criteria based on which the shifting of the automatic shifting portion 20 is determined, and represents one example of the shifting diagram plotted on a two-dimensional coordinate with parameters including the vehicle speed V and demanded output torque $T_{OUT}$ indicative of the drive-force correlation value. In FIG. 7, the solid lines represent upshift lines and single dot lines represent downshift lines.

In FIG. 7, the broken lines represent a determining vehicle speed V1 and determining output torque T1 for the switching control means 50 to determine which of the step-variable control region and the continuously variable control region is to be selected. That is, the broken lines in FIG. 7 represent a high vehicle-speed determining line, forming a series of a determining vehicle speed V1 representing a predetermined high-speed drive determining line for determining a high speed running state of a hybrid vehicle, and a high-output drive determining line, forming a series of determining output torque T1 representing a predetermined high-output drive determining line for determining the drive-force correlation value related to the drive force of the hybrid vehicle. Further, as shown by double dot lines in contrast to the broken lines, further, there is a hysteresis in determining the step-variable control region and the continuously variable control region.

That is, FIG. 7 represents a switching diagram (switching map and relationship), preliminarily stored in terms of the parameters including the vehicle speed V and output torque $T_{OUT}$, including the determining vehicle speed V1 and determining output torque T1, based on which the switching control means 50 determines a region to which the step-variable control region and the continuously variable control region belongs. This shifting diagram may be preliminarily stored as the shifting map in the memory means 56. Moreover, the shifting diagram may be of the type, including at least one of the determining vehicle speed V1 and determining output torque T1, and may include a shifting diagram that is preliminarily stored in terms of a parameter composed of any one of the vehicle speed V and output torque $T_{OUT}$.

The shifting diagram, the switching diagram or the drive-force source switching diagram or the like may not be stored as the map but may be stored as one determining formula, based on which the actual vehicle speed V and the determining vehicle speed V1 are compared, and the other determining formula based on which output torque $T_{OUT}$ and determining output torque T1 are compared. In this case, the switching control means 50 allows the shifting mechanism 10 to be placed in the step-variable shifting state when a vehicle state, i.e., for instance, an actual vehicle speed exceeds the determining vehicle speed V1. In addition, the switching control means 50 places the shifting mechanism 10 in the step-variable shifting state when the vehicle state, i.e., for instance, output torque $T_{OUT}$ of the automatic shifting portion 20 exceeds determining output torque T1.

Further, there is likelihood that functional deteriorations occur in the vehicle state. Examples of such functional deteriorations include functional deterioration caused in equipment related to the electrical path involved in phases in which the first electric motor M1 generates electric energy and electric energy is converted to mechanical energy during the occurrence of a failure in control equipment of an electrical system such as an electric motor or the like for causing the differential portion 11 to operate as the electrically controlled continuously variable transmission. That is, such functional deterioration includes a failure caused in a transmission line connecting the first electric motor M1, the second electric motor M2, the inverter 58 and the battery 60 to each other, or a defective function caused by the failure or a low temperature. In such cases, the switching control means 50 may be configured to place the shifting mechanism 10 in the step-variable shifting state on a priority basis for the purpose of ensuring the running of the vehicle even if the continuously variable control region is present.

As used herein, the term "drive-force correlation value" described above refers to a parameter corresponding to the drive force for the vehicle in one-to-one relation. Such a parameter may include not only drive torque or drive force delivered to the drive wheels 38 but also other factors. The other factors may include an actual value such as engine output torque TE, calculated based on, for instance, output torque $T_{OUT}$ of the automatic shifting portion 20, engine output torque TE, a vehicle acceleration, for instance, an accelerator-opening or a throttle valve opening $\theta_{TH}$ (or an intake air quantity, an air/fuel ratio or a fuel injection quantity) and the engine rotation speed NE. The other factors may also include estimated values such as demanded (target) engine torque TE, demanded (target) output torque $T_{OUT}$ and demanded vehicle drive force that are calculated based on a displacement value of the accelerator pedal actuated by the driver or the throttle valve opening or the like. In addition, drive torque may be calculated in consideration of a differential ratio and a radius of each drive wheel 38 by referring to output torque $T_{OUT}$ or the like or may be directly detected using, for instance, a torque sensor or the like. This is true for each of other torques mentioned above.

Further, if the shifting mechanism 10 is placed in the continuously variable shifting state during the running of the vehicle at a high speed, deterioration occurs in fuel consumption. To address such an issue, for instance, the determining vehicle speed V1 is set to a value such that the shifting mechanism 10 is placed in the step-variable shifting state during the running of the vehicle at the high speed. Furthermore, determining torque T1 is set to a value depending on, for instance, a characteristic of the first electric motor M1 arranged to provide electric energy at a reduced maximal output with a view to minimizing the first electric motor M1 not to cause reactive torque of the first electric motor M1 to cover a high output region of the engine during the running of the vehicle at a high output.

As indicated on the relationships shown in FIG. 7, output torque $T_{OUT}$ is set to a high torque region higher than predetermined determining output torque T1 or the vehicle speed V is set to a high vehicle speed region as a step-variable control region higher than predetermined determining vehicle speed V1. Therefore, a step-variable shifting drive mode is executed in a high drive torque region, where the engine 8 operates at relatively high torque, or the vehicle speed remaining in a relatively high speed region. Further, a continuously variable shifting drive mode is effectuated in a low drive torque region, where the engine 8 operates at relatively low torque, or the vehicle speed remaining in a relatively low speed region, i.e., during a phase of the engine 8 operating in a commonly used output region.

With such operations, during the running of the vehicle at a low/medium speed and low/medium output, the shifting mechanism 10 is placed in the continuously variable shifting state to ensure improved fuel economy performance of the vehicle. During the running of the vehicle at the high speed where an actual vehicle speed V exceeds the determining vehicle speed V1, the shifting mechanism 10 is rendered operative as the step-variable transmission in the step-variable shifting state. In this moment, the output of the engine 8 is transferred to the drive wheels 38 mainly through a mechanical power transmitting path. This suppresses a loss in conversion between the drive force and electric energy, occurring when the shifting mechanism 10 is caused to act as the electrically controlled continuously variable transmission, providing improved fuel consumption.

During the running of the vehicle in the high output drive mode with the drive-force correlation value such as output torque $T_{OUT}$ or the like exceeding determining torque T1, the shifting mechanism 10 is rendered operative as the step-variable transmission in the step-variable shifting state. In this moment, the output of the engine 8 is transferred to the drive wheels 38 mainly through the mechanical power transmitting path. In this moment, the electrically controlled continuously variable transmission is caused to operate in the low/medium speed running region and the low/medium output running region of the vehicle. This minimizes the maximum value of electric energy to be generated by the first electric motor M1, i.e., electric energy to be transmitted through the first electric motor M1, thereby causing the first electric motor M1 per se or a vehicle power transmitting apparatus including such a component part to be further miniaturized in structure.

In another viewpoint, further, during the running of the vehicle in such a high output drive mode, the driver places more emphasis on an attempt to require the drive force and less emphasis on an attempt to improve fuel consumption. Thus, the shifting mechanism 10 is switched from the continuously variable shifting state to the step-variable shifting state (fixed shifting state). With such a switching operation, the user can enjoy a variation in the engine rotation speed NE, i.e., a rhythmical variation in the engine rotation speed NE resulting from the upshifting operation in the step-variable automatic shifting drive mode.

Meanwhile, if the determination is made with reference to the shifting diagram shown in FIG. 7 that the shifting needs to be executed in the automatic shifting portion 20, the shifting operation is initiated in the automatic shifting portion 20. Here, a time interval between the initiation of the shifting operation and the actual shift initiation varies depending on a kind of shifting because of a structural reason of the automatic shifting portion 20. In addition, as used herein, the term "the initiation of the shifting operation" corresponds to timing at which the initiation of a drop occurs in an engaging hydraulic pressure of an on-disengaging-side friction engaging device disengaged during the shifting and the initiation of an increase in the engaging hydraulic pressure of an on-engaging-side friction engaging device engaged during the shifting. The term "the actual shift initiation" corresponds to the initiation of a torque phase or an inertia phase during the shifting. Here, uniquely setting timing for the initiation of the shifting operation to be executed in the automatic shifting portion 20 results in likelihood of causing the first electric motor M1 to operate outside an operating range with a resultant deterioration in controllability. In contrast, uniquely setting timing for the initiation of the shifting operation so as to avoid the use of the first electric motor M1 in a region outside the operating range results in likelihood of causing a difficulty in obtaining adequate power performance.

Figure 8A:
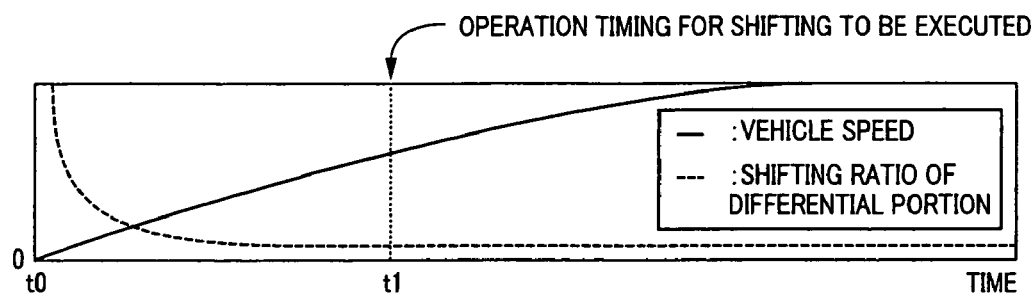
FIG. 8 is timing chart showing examples in which time intervals from an operation of an automatic shifting portion determined that a shifting operation was initiated to an actual shift initiation are short and long.
Figure 8B:
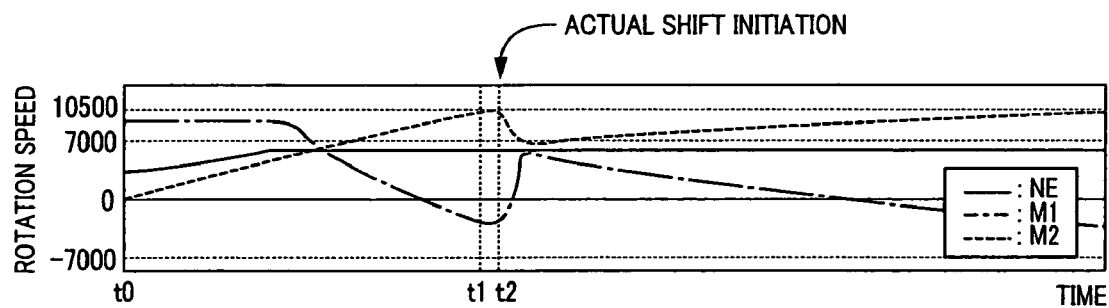
Figure 8C:
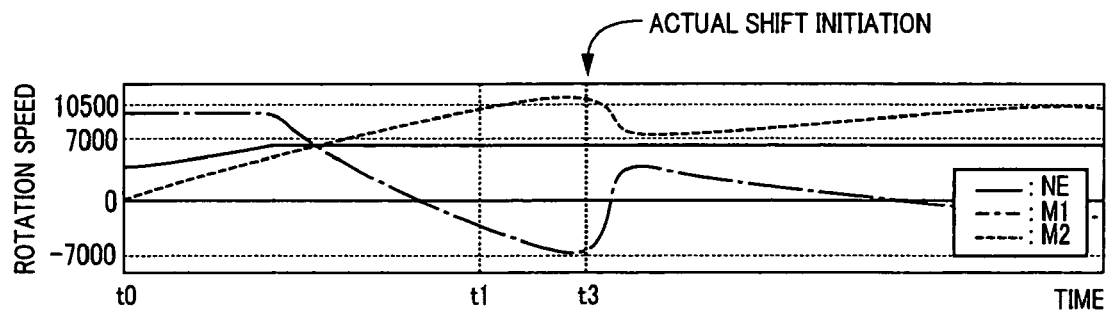

FIGS. 8A and 8B and 8C are timing charts showing states under which an accelerator pedal is depressed at a vehicle-halt condition for acceleration and the automatic shifting portion 20 is caused to upshift from, for instance, a 1st-speed gear position to a 2nd-speed gear position. With the accelerator pedal depressed at time t0, the vehicle speed V increases as shown by a solid line in FIG. 8A and the rotation speed $N_{M2}$ of the second electric motor M2 increases as shown by broken lines in FIGS. 8B and 8C. In addition, as the engine rotation speed NE increases up to a given rotation speed at which the engine rotation speed NE is nearly fixed, the rotation speed $N_{M1}$ of the first electric motor M1 decreases to vary from a normal rotation state to a reverse rotations state as indicated by single dot lines in FIGS. 8B and 8C.

Here, FIG. 8B represents an example in which the time interval from the initiation of the shifting operation to the actual shift initiation is short and FIG. 8C represents another example in which the time interval from the initiation of the shifting operation to the actual shift initiation is long. As shown in FIG. 8C, if the time interval is long, the rotation speed $N_{M1}$ of the first electric motor M1 increases in absolute value with resultant likelihood of causing the first electric motor M1 to operate in the region outside the operating range. To address such an issue, the present embodiment contemplates altering an interval L from the initiation of the shifting operation executed in the automatic shifting portion 20, to the actual shift initiation depending on the kind of shifting to allow the shifting to be appropriately executed. Hereunder, such a control will be described below.

Figure 9:
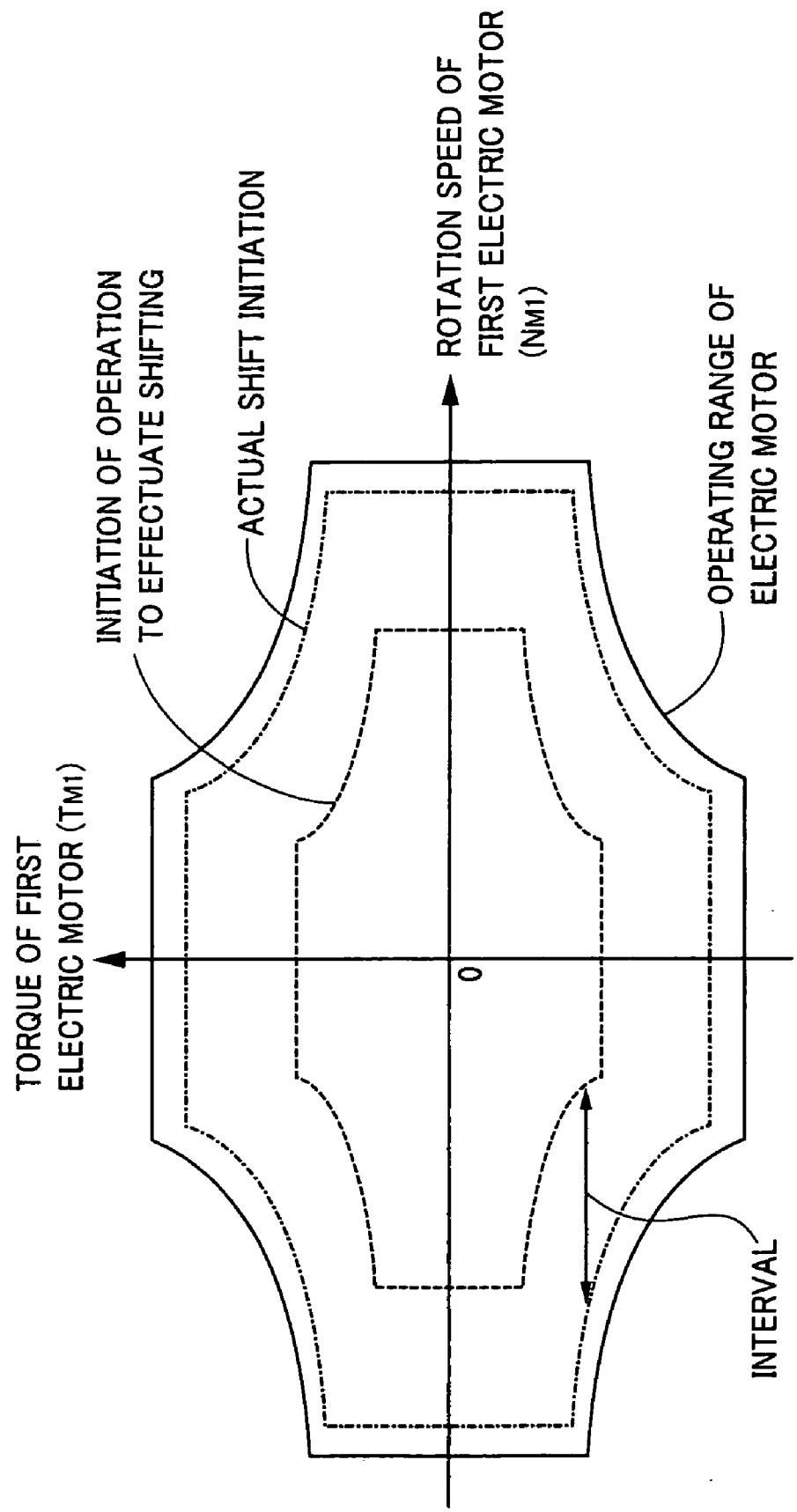
FIG. 9 is a view representing one example of a case in which an interval is defined in terms of torque and a rotation speed of a first electric motor.

Turning back to FIG. 6, shift interval altering means 70 alters the interval L between the initiation of the operation to execute the shifting and the actual shift initiation in the automatic shifting portion 20. Here, the interval L is defined in terms of torque $T_{M1}$ and the rotation speed $N_{M1}$ of the first electric motor M1 or the output of the first electric motor M1. FIG. 9 represents one example in which the interval L is defined in terms of torque $T_{M1}$ and the rotation speed $N_{M1}$ of the first electric motor M1. In FIG. 9, a solid line represents a boundary line for the operating range of the first electric motor M1 that is determined with rating depending on performance of the first electric motor M1. In addition, a broken line represents a boundary line for the initiation of the operation to effectuate the shifting in the automatic shifting portion 20 and a single dot line represents a boundary line for the actual shift initiation executed in the automatic shifting portion 20.

Thus, in normal practice, the initiation to execute a shift control is determined on consideration of a time interval before the actual shift initiation. Such a leeway is designated by the interval L in FIG. 9. In FIG. 9, to take the interval L in terms of, for instance, the rotation speed, the interval L corresponds to a distance between a rotation speed at which the operation is initiated to execute the shifting indicated by the broken line, and a rotation speed at which the actual shift initiation occurs indicated by the single dot line. The shift interval altering means 70 appropriately alters the interval L depending on the kind of the shifting. More particularly, suitably altering the boundary line for the initiation of operation to execute the shifting and/or the boundary line for the actual shift initiation indicated by the single dot line.

Further, upon determining an absolute value of the boundary line for the operation initiation indicated by the broken line to be small, the shifting is immediately executed in the automatic shifting portion 20. Furthermore, if the rotation speed at which the actual shift initiation, indicated by the single dot line occurs, is altered to be closer to the operating range boundary line indicated by the solid line, then, it becomes possible to obtain adequate power performance. When the interval L is caused to increase with, for instance, the rotation speed $N_{M1}$ of the first electric motor M1 remaining in a negative region, the boundary line for the operation initiation indicated by the broken line is shifted to a positive direction. In an alternative, the boundary line for the actual shift initiation indicated by the single dot line is shifted to a further negative direction within a range not to exceed a rating indicated by the solid line. By so doing, the interval L for the rotation speed increases. In addition, the first electric motor M1 of the present embodiment corresponds to an electric motor of the present invention.

The interval L is altered depending on, for instance, an operating load, the gear position of the automatic shifting portion 20 or the working oil temperature $T_{OIL}$ of the automatic shifting portion 20. Operating load determining means 72 detect the operating load of the engine 8 based on, for instance, a gradient of a road surface or an accelerator-opening Acc for determining an appropriate interval L depending on the detected operating load. In addition, the interval L, based on the operating load, is preliminarily determined on experimental tests and stored in storage means 56.

Figure 10:
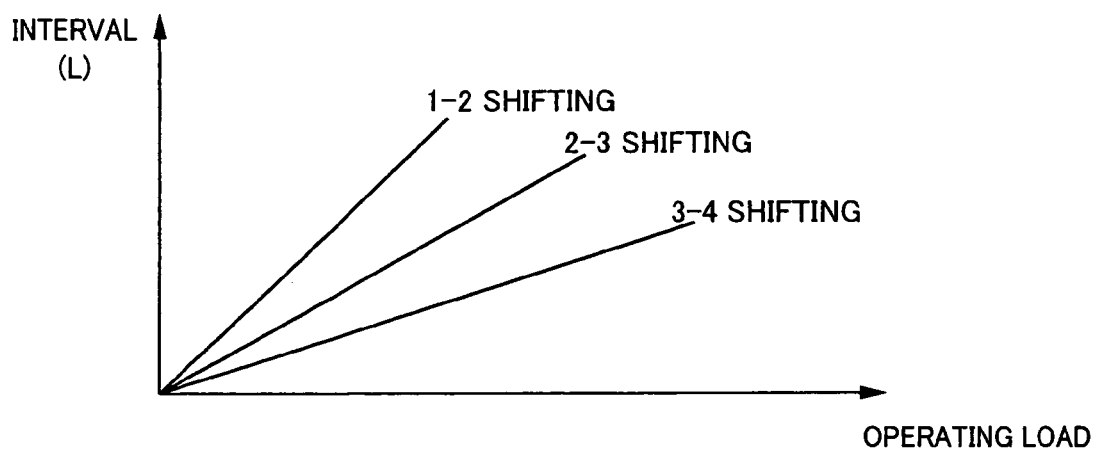
FIG. 10 is a view showing the relationship between an operating load and a gear position, and the interval.

The shift interval altering means 70 alters the interval L of the first electric motor M1 based on a determination result of the operating load determining means 72. Here, the interval L is determined, as shown in FIG. 10, such that the greater the operating load, the greater will be the interval L. That is, the interval L is determined to vary in proportion to the operating load. With the increase in the operating load, output torque of the engine 8 also increases, and it is likely to fluctuate during the shifting. Therefore, increasing the interval L, when the operating load is large, results in a leeway, thereby enabling the automatic shifting portion 20 to execute the shifting over a long time.

Gear position determining means 74 detect a gear position to be shifted in the automatic shifting portion 20 for making a query as to whether the resulting gear position belongs to a low-speed gear position. Further, the gear position determining means 74 detects a step ratio of the automatic shifting portion 20 on a stage before and after the shifting and determines an appropriate interval L depending on the detected step ratio. As used herein, moreover, the term "step ratio"

refers to a ratio (step in speed ratio) of the speed ratios on the stage before and after the shifting executed in the automatic shifting portion 20 and corresponds to a step indicated on the engagement operation table shown in FIG. 2. Here, the interval L is determined such that the lower the gear position, i.e., the higher the speed ratio, the greater will be the interval L as shown in FIG. 10. With the lower the gear position, i.e., the greater the speed ratio, the acceleration increases with a resultant reduction in leeway of time.

Figure 11:
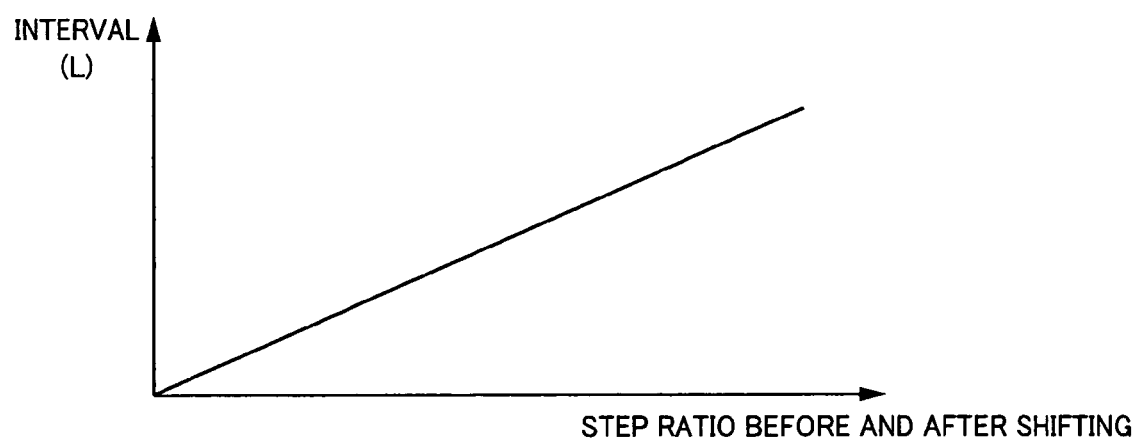
FIG. 11 is a view showing the relationship between a step ratio of the automatic shifting portion and the interval.

To address such an issue, the interval L is varied such that the lower the gear position, the greater will be the interval L, thereby enabling the shifting to be executed in the automatic shifting portion 20 with increased leeway. Moreover, the interval L is varied, as shown in FIG. 11, such that the greater the step ratio, the greater will be the interval L. With an increase in the step ratio, output torque of the automatic shifting portion 20 is likely to easily fluctuate. However, increasing the interval L results in an effect of executing the shifting of the automatic shifting portion 20 over a long time, thereby suppressing the fluctuation of output torque.

Figure 12:
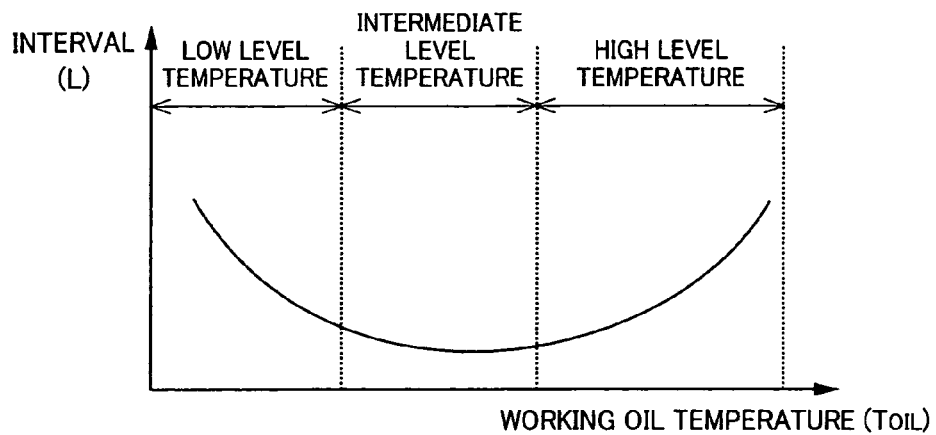
FIG. 12 is a view showing the relationship between an oil temperature of a working oil and the interval.

Working oil temperature determining means 76 detects a working oil temperature $T_{OIL}$ of the working oil in the automatic shifting portion 20 to determine an appropriate interval L depending on the detected working oil temperature $T_{OIL}$. The shift interval altering means 70 alters the interval L based on the determination result of the working oil temperature determining means 76. Here, the interval L is determined, as shown in FIG. 12, such that the lower the working oil temperature $T_{OIL}$ and the higher the working oil temperature $T_{OIL}$ of working oil in the automatic shifting portion 20, the greater will be the interval L. With the working oil temperature $T_{OIL}$, remaining at a low level, a viscosity increases with a resultant drop in response of a hydraulic actuator incorporated in the automatic shifting portion 20 for executing the shifting portion 20. Therefore, increasing the interval L allows a time for the shifting to be ensured, thereby suppressing an adverse affect causing the drop in response. In addition, with the working oil temperature $T_{OIL}$ remaining at a high level, there is likelihood that working oil easily leaks from a clearance present in a hydraulic control valve for controlling the engaging hydraulic pressure in the automatic shifting portion 20, resulting in a drop in response. Therefore, increasing the interval L allows the time for the shifting to be ensured, thereby suppressing the adverse affect causing the drop in response.

Figure 13:
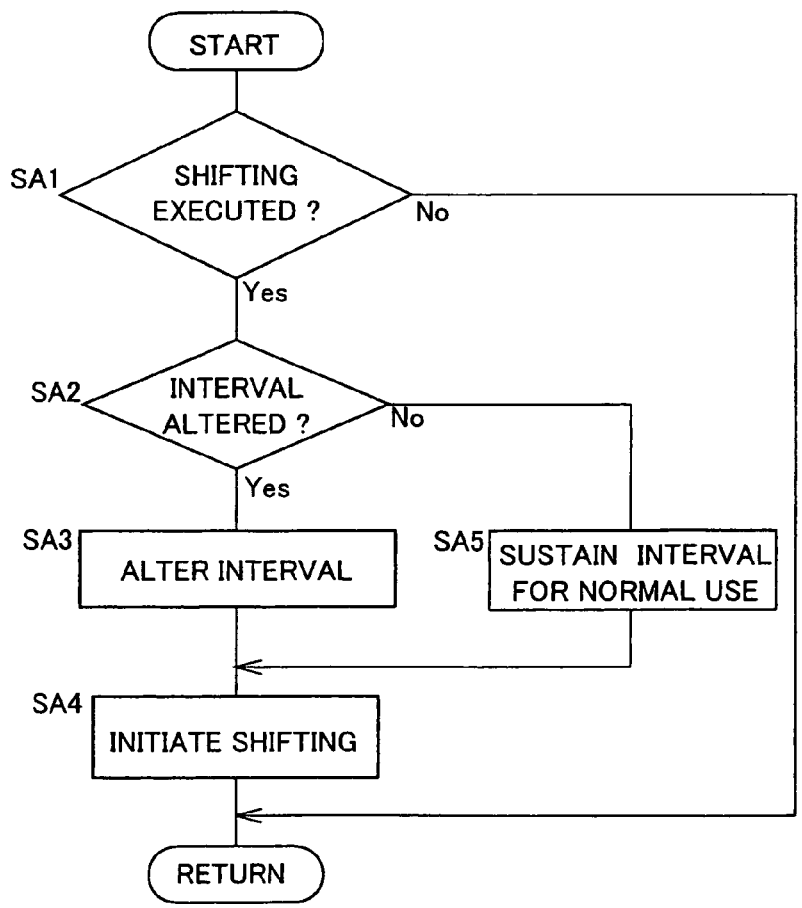
FIG. 13 is a flow chart illustrating a major control operation to be executed with an electronic control device, that is, a control operation for permitting a shifting to be executed upon altering the interval defined in terms of torque and the rotation speed of the first electric motor.

FIG. 13 is a flow chart for illustrating a major control operation, executed with the electronic control device 40, i.e., a control operation in which the interval L, defined in terms of the rotation speed and torque of the first electric motor M1, is altered during the shifting to allow the shifting to be execute. Such a control operation is repeatedly executed on an extremely short cycle in the order of, for instance, several milliseconds or several tens milliseconds.

First, at step SA1 corresponding to the step-variable shift control means 54, a query is made as to whether the shifting is to be executed in the automatic shifting portion 20. If the answer to SA1 is no, then, at SA2 corresponding to the operating load determining means 72, the gear position determining means 74 and the working oil temperature determining means 76, a query is made as to whether the interval L is to be altered depending on the operating load, the gear position (step ratio) and the working oil temperature $T_{OIL}$.

If the answer to SA2 is no, then, at SA5 in which the interval L is set to a predetermined reference interval, the shifting is executed based on such a reference interval. If the answer to SA2 is yes, then, at SA3 corresponding to the shifting interval altering means 70, the interval L is altered to an optimum value based on the operating load, the gear position (step ratio) and the working oil temperature $T_{OIL}$, upon which the shifting is executed at SA5. In addition, the interval L, determined based on the operating load, the gear position (step ratio) and the working oil temperature $T_{OIL}$, varies in tendencies stored in the storage means 56, respectively, and the interval L is comprehensively determined based on these parameters.

With the present embodiment, as set forth above, there is provided the shift interval altering means 70 operative to alter the interval L between (from) the operation initiation to execute the shifting in the automatic shifting portion 20 and (to) the actual shift initiation depending on the kind of the shifting. This allows the appropriate interval L to be determined for the shifting, enabling adequate power performance to be obtained while capable of avoiding the use of the first electric motor M1 in the region outside the operating range thereof to suppress deterioration in controllability.

With the present embodiment, further, since the interval L is defined in terms of torque $T_{M1}$ and the rotation speed $N_{M1}$ of the first electric motor M1, the interval L can be easily determined.

With the present embodiment, furthermore, since the interval L is defined in terms of the output of the first electric motor M1, the interval L can be easily determined.

With the present embodiment, moreover, the interval L is defined such that the greater the operating load, the greater will be the interval L with resultant increased leeway. Thus, the automatic shifting portion 20 can execute the shifting over a long time, thereby enabling the suppression of fluctuation in, for instance, output torque.

With the present embodiment, further, the interval L is defined such that the lower the oil temperature of the automatic shifting portion 20, the greater will be the interval L. Thus, even though a lowered oil temperature results in a drop in response of the hydraulic actuator, increasing the interval L allows increased leeway to be provided with a resultant reduction in an adverse affect.

With the present embodiment, furthermore, the interval L is defined such that the higher the oil temperature of working oil of the automatic shifting portion 20, the greater will be the interval L. In this case, there is likelihood that working oil tends to easily leak through the clearance present in the control valve for controlling the hydraulic pressure, thereby causing a drop to easily occur in response. However, increasing the interval L allows increased leeway to be provided with a resultant minimization in the adverse affect.

With the present embodiment, moreover, the interval L is defined such that the higher the speed ratio of the automatic shifting portion 20, the greater will be the interval L. In this case, the higher the speed ratio, the greater will be the acceleration and the smaller will be the leeway in time. However, increasing the interval L allows increased leeway in time to be obtained. In addition, increasing the interval L such that the lower the gear position to be shifted, the greater will be the interval L allows the shifting to be executed over a long time. This enables the suppression of rapid change in output torque.

With the present embodiment, further, the interval L is defined such that the greater the step ratio of the automatic shifting portion 20 on a stage before and after the shifting, the greater will be the interval L. This can execute the shifting over a long time such that no rapid change occurs in output torque.

With the present embodiment, further, since the shift initiation represents the torque-phase initiation or the inertia-phase initiation, when the shifting belongs to the torque phase or the inertia phase, for instance, the first electric motor M1 can be used in the area the operating range.

With the present embodiment, furthermore, since the automatic shifting portion 20 achieves a step-variable speed ratio, the shifting can be executed in a stepwise manner. In this case, setting the interval L to an appropriate value enables an optimum shifting to be executed.

Next, another embodiments will be described below. In the following description, further, the component parts common to those of the embodiment, previously described, bear like reference numerals to omit redundant description.

Second Embodiment

Figure 14:
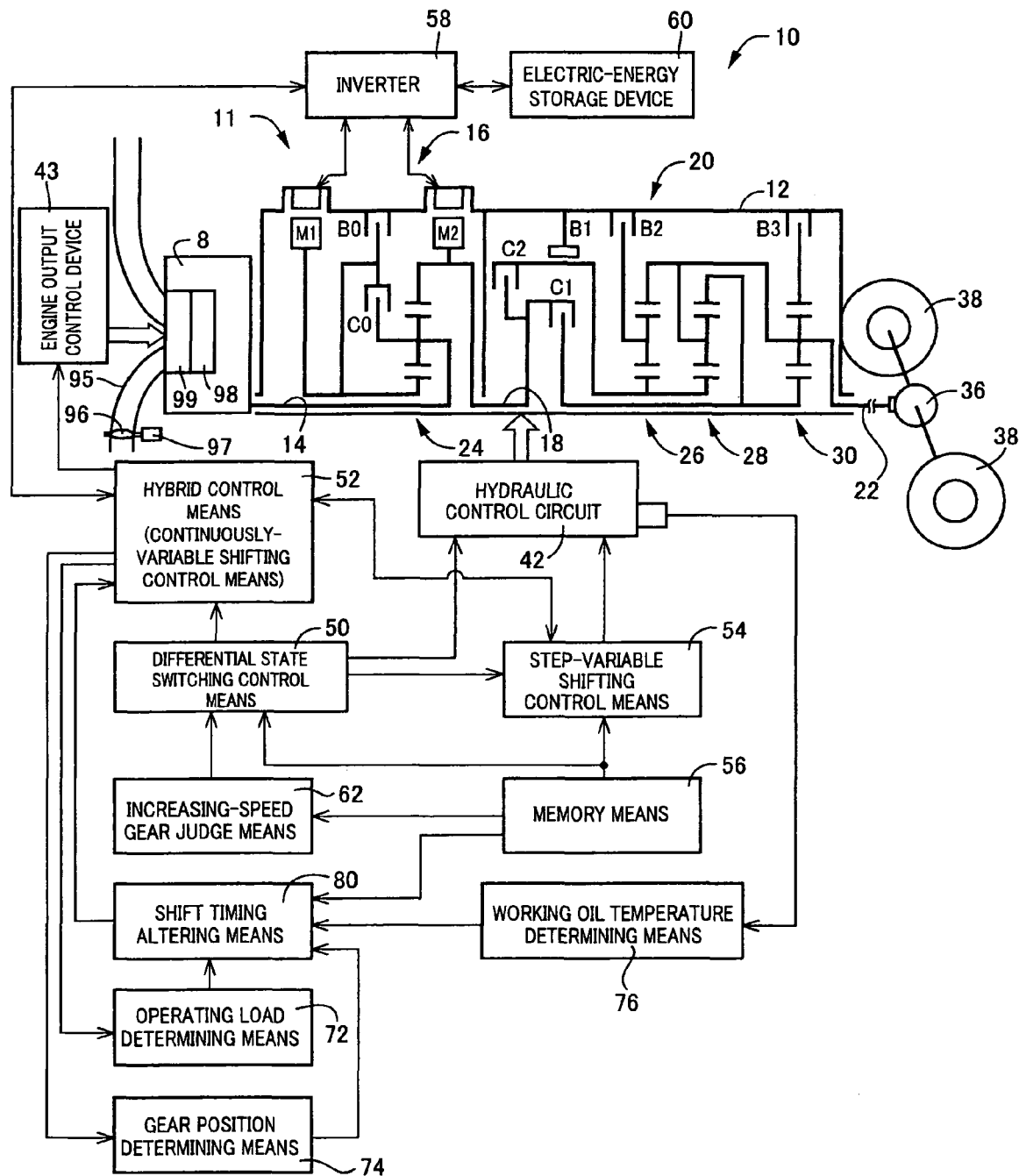
FIG. 14 is a functional block diagram illustrating a major control operation to be executed with an electronic control device of another embodiment according to the present invention.

FIG. 14 is a functional block diagram for illustrating a major control function to be executed by an electronic control device 40 of another embodiment according to the present invention. The present functional block diagram differs from the functional block diagram, shown in FIG. 6, only in that the shift interval altering means 70, shown in FIG. 6, is replaced with shift timing altering means 80. Accordingly, description will be made with a focus on the shift timing altering means 80.

The shift timing altering means 80 alters a timing for the operation initiation at which the shifting is executed in the automatic shifting portion 20. Also, since the timing for the operation initiation corresponds to time t1 in FIG. 8, the timing for the operation initiation is assigned to be time t1 (operation-initiation timing t1) for the operation to be initiated. Even with the present embodiment, the operation-initiation timing t1 can be defined in terms of torque $T_{M1}$ and the rotation speed $N_{M1}$ or output of the first electric motor M1.

That is, the operation-initiation timing t1 is defined in a manner as shown by a broken line in FIG. 9 and the shift timing altering means 80 alters the operation-initiation timing t1 in a manner as indicated by a broken line in FIG. 9. Here, in order to make the operation-initiation timing t1 faster, a boundary line for the operation initiation indicated by the broken line is shifted further toward a zero rotation speed. More particularly, a boundary line for a normal i.e., positive rotation speed to be shifted further toward a low rotation speed (zero rotation speed) or a boundary line for a negative rotation speed is shifted further toward a high speed rotation speed (zero rotation speed), thereby making the operation-initiation timing t1 faster.

Figure 15:
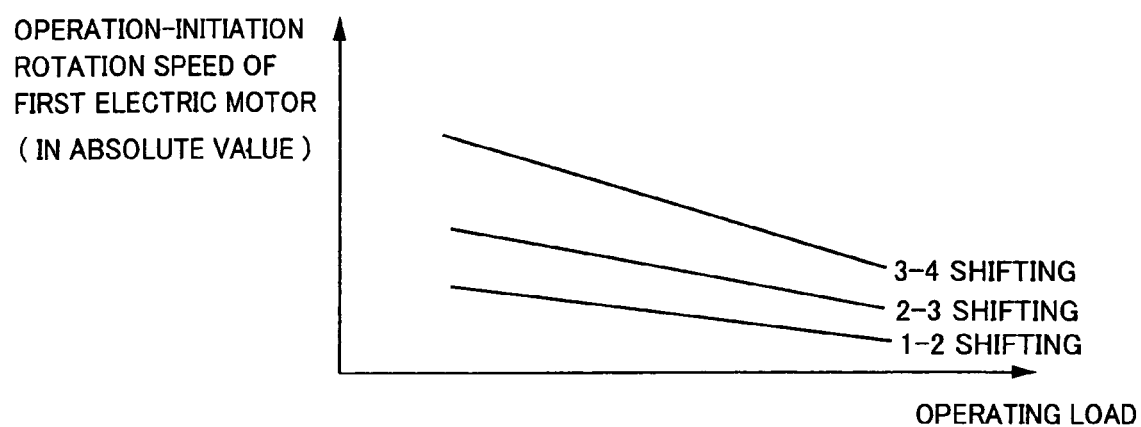
FIG. 15 is a view showing the relationship between the operating load, and the rotation speed (in absolute value) of the first electric motor with which the initiation of the shifting operation of the automatic shifting portion is defined.

The operation-initiation timing t1 is altered depending on, for instance, the operating load, the gear position of the automatic shifting portion 20 or the working oil temperature of the automatic shifting portion 20. The operating load determining means 72 detects the operating load on the engine 8 by referring to the gradient of the road surface and the accelerator-opening Acc or the like, thereby determining an appropriate operation-initiation timing t1 depending on the magnitude of the operating load. FIG. 15 represents the relationship between the operating load and the rotation speed (in absolute value) of the first electric motor M1 at which the shift operation is initiated in the automatic shifting portion 20. As will be apparent from FIG. 15, the operation initiation is determined such that the greater the operating load, the smaller will be the operation-initiation rotation speed.

That is, the greater the operating load, the lower will be the operation-initiation rotation speed. This makes the shift-operation initiation timing of the automatic shifting portion 20 faster. The greater the operating load, the easier will be the fluctuation in output torque during the shifting of the automatic shifting portion 20. Making the operation-initiation timing t1 of the automatic shifting portion 20 faster enables the shifting to be initiated over a long time.

The gear position determining means 74 detects the gear position to be shifted in the automatic shifting portion 20 to determine a appropriate operation-initiation timing t1 based on the detected gear position. Further, the gear position determining means 74 detects the step ratio of the automatic shifting portion 20 on a stage before and after the shifting to determine the appropriate operation-initiation timing t1 based on the stepped step ratio. As shown in FIG. 15, the gear position to be shifted is determined such that the lower the gear position, i.e., the higher the speed ratio, the lower will be the operation-initiation rotation speed of the first electric motor M1.

Figure 16:
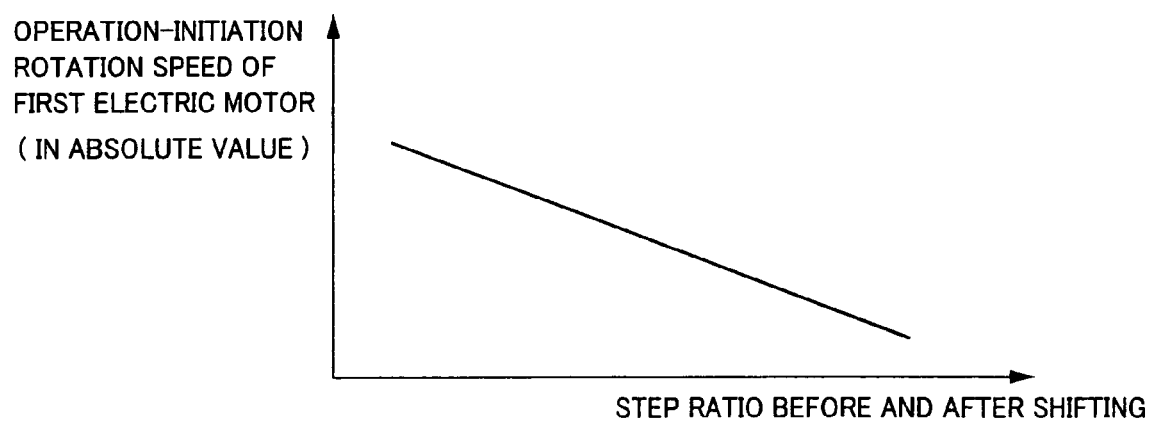
FIG. 16 is a view showing the relationship between the step ratio of the automatic shifting portion on a stage before and after the shifting, and the rotation speed (in absolute value) of the first electric motor with which the initiation of the shifting operation of the automatic shifting portion is defined.

In other words, the higher the speed ratio of the automatic shifting portion 20, the faster will be the shift-operation initiation timing t1 of the automatic shifting portion 20. As shown in FIG. 16, the greater the step ratio of the automatic shifting portion 20 on the stage before and after the shifting thereof, the lower will be the operation-initiation rotation speed of the first electric motor M1. Stated another way, the greater the step ratio of the automatic shifting portion 20, the faster will be the shift-operation initiation timing t1 of the automatic shifting portion 20. Here, higher the speed ratio of the automatic shifting portion 20, or the greater the step ratio, the more liable will be the fluctuation in output torque of the automatic shifting portion 20. However, causing the shift-operation initiation timing faster enables the shifting to be executed over a long time, thereby suppressing the fluctuation in torque.

Figure 17:
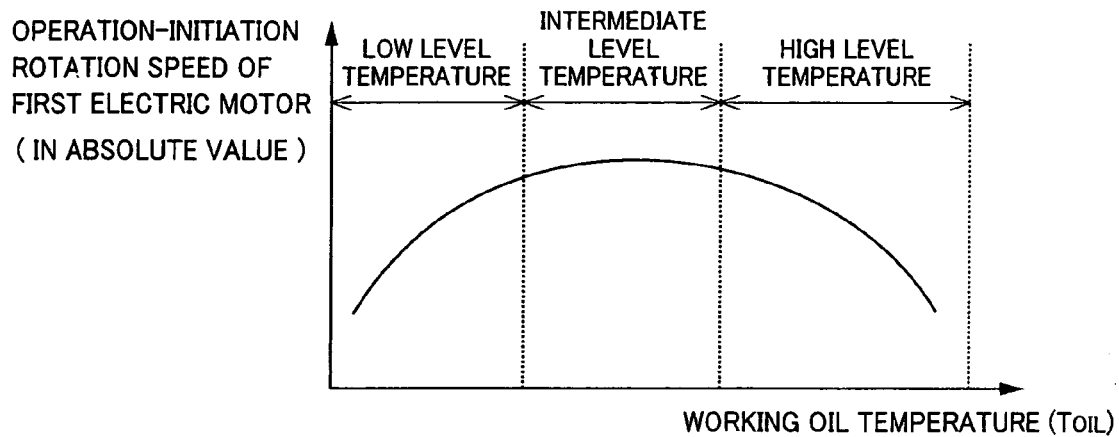
FIG. 17 is a view showing the relationship between the working oil temperature, and the rotation speed of the first electric motor at which the automatic shifting portion initiates the shifting operation.

The working oil temperature determining means 76 detects a working oil temperature $T_{OIL}$ of the working oil present in the automatic shifting portion 20 to determine an appropriate operation-initiation timing t1 depending on the detected working oil temperature $T_{OIL}$. FIG. 17 shows the relationship between the working oil temperature and the rotation speed of the first electric motor M1 at which a shifting operation is initiated in the automatic shifting portion 20. As shown in FIG. 17, the lower the working oil temperature $T_{OIL}$ of the working oil in the automatic shifting portion 20, the lower will be the operation-initiation rotation speed. Further, the higher the working oil temperature $T_{OIL}$, the lower will be the operation-initiation rotation speed. In other words, if the working oil temperature $T_{OIL}$ lies at low and high levels, then, the shift-operation initiation timing t1 of the automatic shifting portion 20 is made faster. If the working oil temperature $T_{OIL}$ is low, working oil has increasing viscosity with a resultant drop in response of the hydraulic actuator incorporated in the automatic shifting portion 20.

Making the operation-initiation timing t1 faster ensures the time for the shifting to be executed for thereby minimizing the drop in response. In addition, if the working oil temperature $T_{OIL}$ is high, it is likely that working oil easily leaks through a clearance present in the hydraulic control valve arranged to control the hydraulic pressure in the automatic shifting portion 20, resulting in a drop in response. Therefore, making the operation-initiation timing t1 faster ensures the time for the shifting to be executed with a consequence of minimizing the drop in response.

The shift timing altering means 80 determines the shift-operation initiation timing t1 for the automatic shifting portion 20 depending on the determination results of the operating load determining means 72, the gear position determining means 74 and the working oil temperature determining means 76. Also, the shift timing altering means 80 determines the operation-initiation timing t1 in terms of comprehensively tinged determination results. For instance, the operation-initiation timing t1 is determined upon correcting the operation-initiation timing, serving as a predetermined reference, based on the respective determination results.

Figure 18:
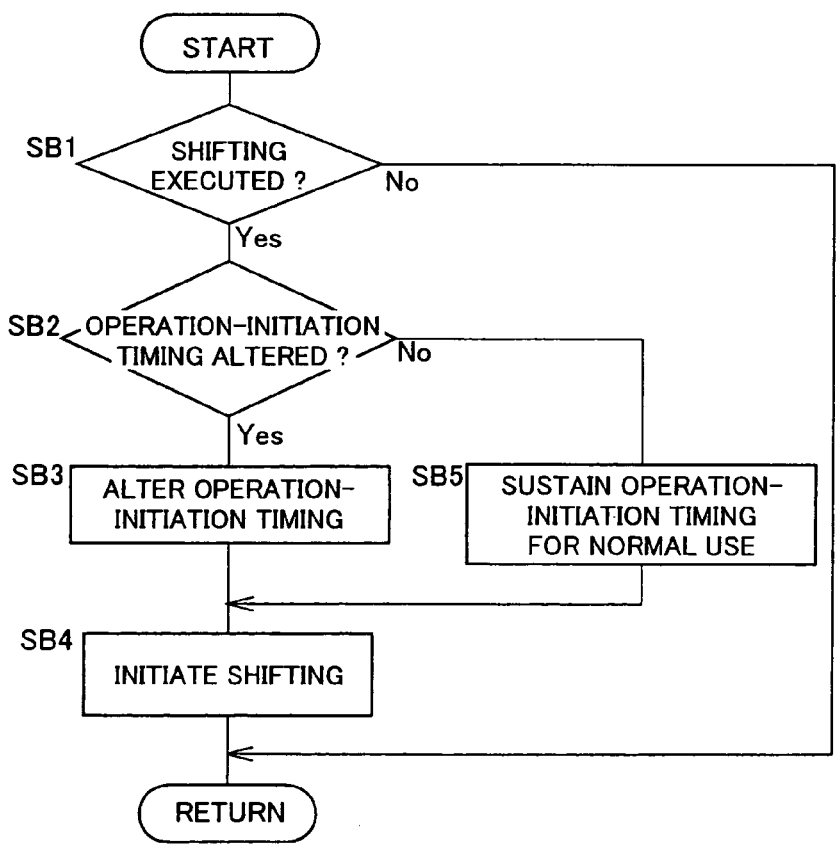
FIG. 18 is a flow chart illustrating the major control operation to be executed with the electronic control device, that is, the control operation for permitting the shifting to be executed upon altering timing of the initiation of the shifting operation of the automatic shifting portion defined in terms of torque and the rotation speed of the first electric motor.

FIG. 18 is a flow chart for illustrating a major control operation to be executed with the electronic control device 40, i.e., a control operation to alter the shift-operation initiation timing t1, defined in terms of the rotation speed $N_{M1}$ and torque $T_{M1}$ of the first electric motor M1, for the automatic shifting potion 20 to execute the shifting. This operation is repeatedly executed on an extremely short cycle time in the order of, for instance, several milliseconds to several tens milliseconds.

First, at SB1 corresponding to the step-variable shift control means 54, a query is made as to whether the shifting needs to be executed in the automatic shifting portion 20. If the answer to SB1 is no, then, the instant routine is completed. In contrast, if the answer to SB1 is yes, then at SB2 corresponding to the operating load determining means 72, the gear position determining means 74 and the working oil determining means 76, a query is made as to whether the shift-operation initiation timing t1 needs to be altered in the automatic shifting portion 20 based on the operating load, the gear position (step ratio) and the working oil temperature $T_{OIL}$.

If the answer to SB2 is no, then at SB5, a predetermined operation-initiation timing for normal use is sustained, and at SB4, the shifting is executed based on the resulting operation-initiation timing. If the answer to SB2 is yes, then at SB3 corresponding to the shift timing altering means 80, the shift-operation initiation timing t1 is set to an appropriate timing t1, and at SB4, the shifting is executed based on the resulting operation-initiation timing t1.

As set forth above, the present embodiment includes the shift timing altering means 80 operative to alter the operation-initiation timing t1 depending on the kind of the shifting for the shifting to be executed in the automatic shifting portion 20. Thus, by initiating the shift operation at the appropriate timing t1 during the shifting adequate power performance can be obtained. In addition, avoiding the first electric motor M1 from operating in the region outside the operating range thereof enables the minimization of deterioration in controllability.

With the present embodiment, further, the operation-initiation timing t1 is defined in terms of torque $T_{M1}$ and the rotation speed $N_{M1}$ of the first electric motor M1. This can easily determine the operation-initiation timing t1 for the automatic shifting portion 20.

With the present embodiment, furthermore, the operation-initiation timing t1 is defined in terms of the output of the first electric motor M1. This can easily determine the operation-initiation timing t1 for the automatic shifting portion 20.

With the present embodiment, moreover, the operation-initiation timing t1 is determined such that the greater the operating load, the faster will be the operation-initiation timing t1. This allows the sifting to be executed over a long time, thereby minimizing the fluctuation in, for instance, output torque.

With the present embodiment, further, the operation-initiation timing t1 is determined such that the lower the working oil temperature $T_{OIL}$ of the working oil present in the automatic shifting portion 20, the faster will be the operation-initiation timing t1. The presence of the low working oil temperature results in the occurrence of deterioration in response of the hydraulic actuator. However, making the operation-initiation timing t1 faster enables a shifting time to be ensured, enabling a reduction in an adverse affect on deterioration of response.

With the present embodiment, furthermore, the operation-initiation timing t1 is determined such that the higher the working oil temperature $T_{OIL}$ of the working oil present in the automatic shifting portion 20, the faster will be the operation-initiation timing t1. It is likely that working oil easily leaks from a clearance present in the control valve arranged to control the hydraulic pressure, with a resultant drop in response. Making the operation-initiation timing t1 faster enables the minimization of such an adverse affect.

With the present embodiment, moreover, the operation-initiation timing t1 is determined such that the higher the speed ratio, the faster will be the operation-initiation timing t1. This allows the shifting time to be ensured such that the shifting can be executed over a long time, thereby minimizing the fluctuation in output torque.

With the present embodiment, further, the operation-initiation timing t1 is determined such that the greater the step ratio of the automatic shifting portion 20 on the stage before and after the shifting, the faster will be the operation-initiation timing t1. This allows the shifting time to be ensured, thereby enabling the minimization of the fluctuation in output torque.

With the present embodiment, furthermore, the automatic shifting portion 20 has the step-variable speed ratio to execute the shifting in the step-variable mode. Permitting the operation-initiation timing t1 to be properly determined lead to performance of an optimum shifting.

Third Embodiment

Figure 19:
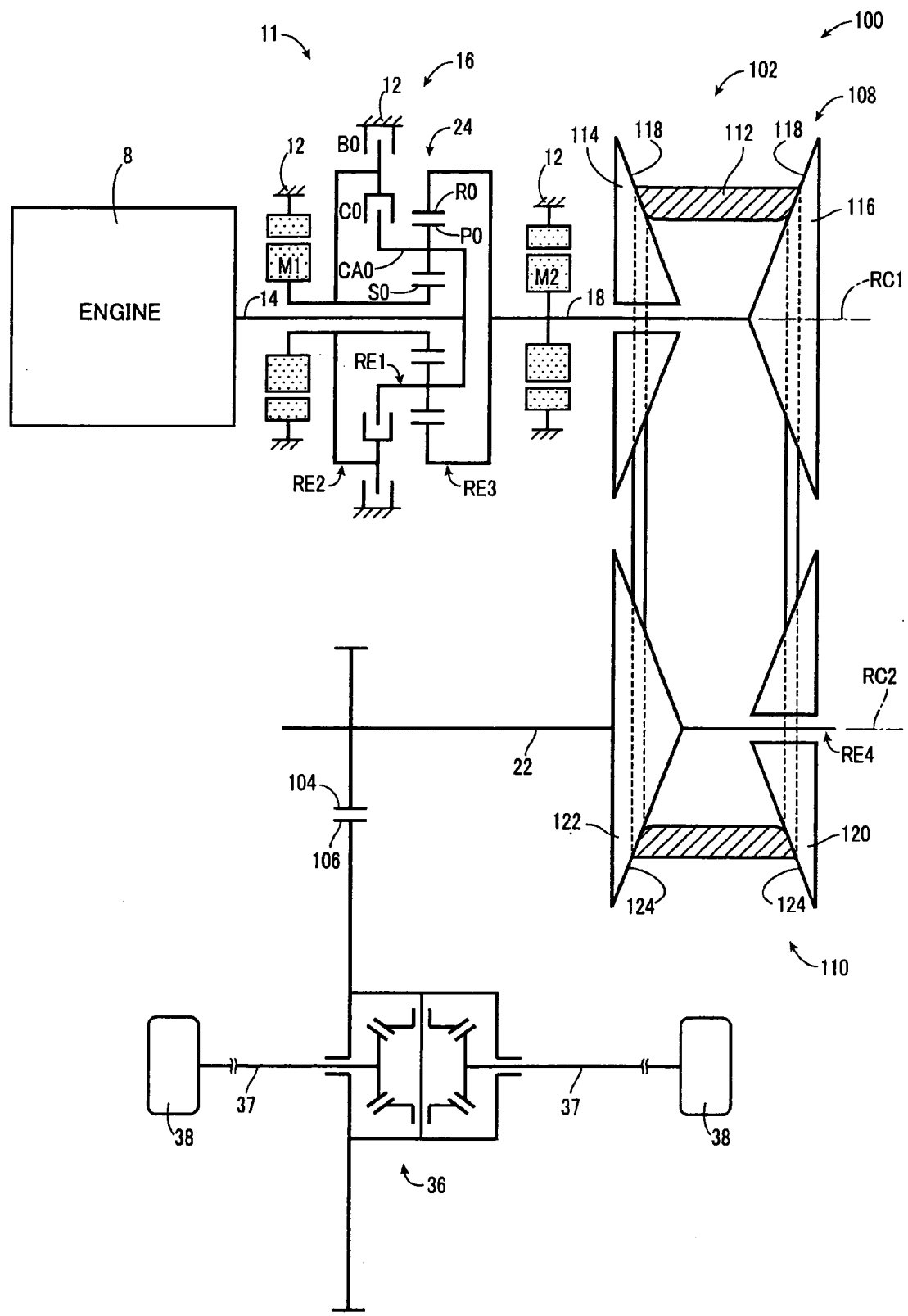
FIG. 19 is a skeleton view illustrating a shifting mechanism of another embodiment to which the control device of the present invention is applied.

FIG. 19 is a skeleton view illustrating a shifting mechanism 100 of another embodiment to which the control device of the present invention is applied. In FIG. 19, the shifting mechanism 100 includes the input shaft 14 acting as the input rotary member, the differential portion 11 directly connected to the input shaft 14 or directly connected thereto via the pulsation absorbing damper (vibration damping device), not shown, the power transmitting member 18 serving as the output rotary member of the differential portion 11, a continuously variable shifting portion 102, and the output shaft 22. The continuously variable shifting portion 102 forms a part of the power transmitting path between the differential portion 11, connected to the power transmitting member 18, and the drive wheels 38 for connecting a first axis RC1 and a second axis RC2, extending parallel thereto, to each other in a power transmissive state. The output shaft 22 is disposed on the second axis RC2 as an output rotary member of the shifting mechanism 100 while acting as a countershaft connected to the continuously variable shifting portion 102 at an output thereof. All of these component parts are sequentially disposed along the first axis RC1 in the transmission case (hereinafter referred to as the "case 12"), acting as the non-rotary member mounted on the vehicle body.

Such a power transmitting device 10 is appropriately applied to an FF (front engine and front drive) type vehicle transversely placed on a hybrid vehicle. Directly connected to the input shaft 14 or directly connected thereto via the pulsation absorbing damper (not shown) is the drive force source such as the engine 8 like the internal combustion engine such as, for instance, the gasoline engine or the diesel engine, etc., for running the vehicle. The drive force, output from the engine 8, is transferred through a differential drive gear 104, connected to an output side of the continuously variable shifting portion 102 via the output shaft 22, a differential gear unit (final speed reducer) 36 having a differential ring gear in mesh with the differential drive gear 104, and a pair of drive axles 37 or the like to the left and right drive wheels 38.

Since the differential portion 11 has the same structure as that of the embodiment described above, description of the same is herein omitted. Further, since a functional block diagram and a flow chart, used in the present embodiment, are similar to those of the embodiment previously mentioned, description of the same is herein omitted. Hereunder, the continuously variable shifting portion 102 will be described below with a focus on points different from those of the previous embodiment. In addition, the continuously variable shifting portion 102 of the present embodiment corresponds to a shifting portion of the present invention.

The continuously variable shifting portion 102 includes a so-called belt-type CVT shifting device that functions as a continuously variable automatic transmission operative to continuously vary a speed ratio $\gamma_{CVT}$ (=rotation speed $N_{18}$ of power transmitting member 18/rotation speed $N_{OUT}$ of output shaft 22) due to a mechanical action. The continuously variable shifting portion 102 includes an input pulley 108 disposed on the first axis RC1 and connected to the power transmitting member 18, an output pulley 110 disposed on the second axis RC2 in parallel to the input pulley 108 and connected to the output shaft 22, and a belt 112 wound between the pair of pulleys 108 and 110 and interconnecting the pair of pulleys 108 and 110 to each other due to a frictional force in the power transmissive state.

The input pulley 108 is comprised of a cone-shaped input slide pulley 114, slidable along the rotary axis, and a cone-shaped input fixed pulley 116 fixed for non-sliding capability. The input slide pulley 114 and the input fixed pulley 116 are assembled to each other with apexes placed in face-to-face relationship to form a V-shaped input pulley groove 118 with which the belt 112 is held in contact. The output pulley 110, having the same structure as the input pulley 108, includes an output slide pulley 120 and an output fixed pulley 122 between which a V-shaped output pulley groove 124 is formed in contact with the belt 112.

With the continuously variable shifting portion 102, the belt 112 is tensioned between the input pulley 108 and the output pulley 110 to obtain a frictional force to transfer the drive force. With both of the input pulleys 118 and the output pulleys 124, the pulleys 114, 116 and the pulleys 120 and 122 have the coned surfaces placed in contact with the belt 112. With such a structure, the input pulley 108 is actuated such that the input slide pulley 114 becomes closer to the input fixed pulley 116 while, in synchronism therewith, the output pulley 110 is actuated such that the output slide pulley 120 is caused to move away from the output fixed pulley 122. In this case, the greater the travel of the output slide pulley 120 moving away the output fixed pulley 122, the greater will be the contact diameter (effective diameter) between the input pulley 108 and the belt 112 and the smaller will be the contact diameter (effective diameter) between the output pulley 110 and the belt 112, resulting in a reduction in speed ratio $\gamma_{CVT}$ of the continuously variable shifting portion 102. That is, with the input slide pulley 114 and the output slide pulley 120 arranged to slide in synchronism with each other upon executing a hydraulic control, the continuously variable shifting portion 102 continuously varies the speed ratio $\gamma_{CVT}$.

Even with the shifting mechanism 100 of such a structure set forth above, the continuously variable shifting portion 102 can be arranged to operate in a step-variable mode with the use of a manual shift or the like in use. In such a case, the present embodiment encounters the same issue as that of the embodiment mentioned above. Therefore, when using the continuously variable shifting portion 102 arranged to operate in the step-variable mode, applying the shift interval altering means 70 or the shift timing altering means 80 enables the same effects as those of the previous embodiment to be obtained.

Fourth Embodiment

Figure 20:
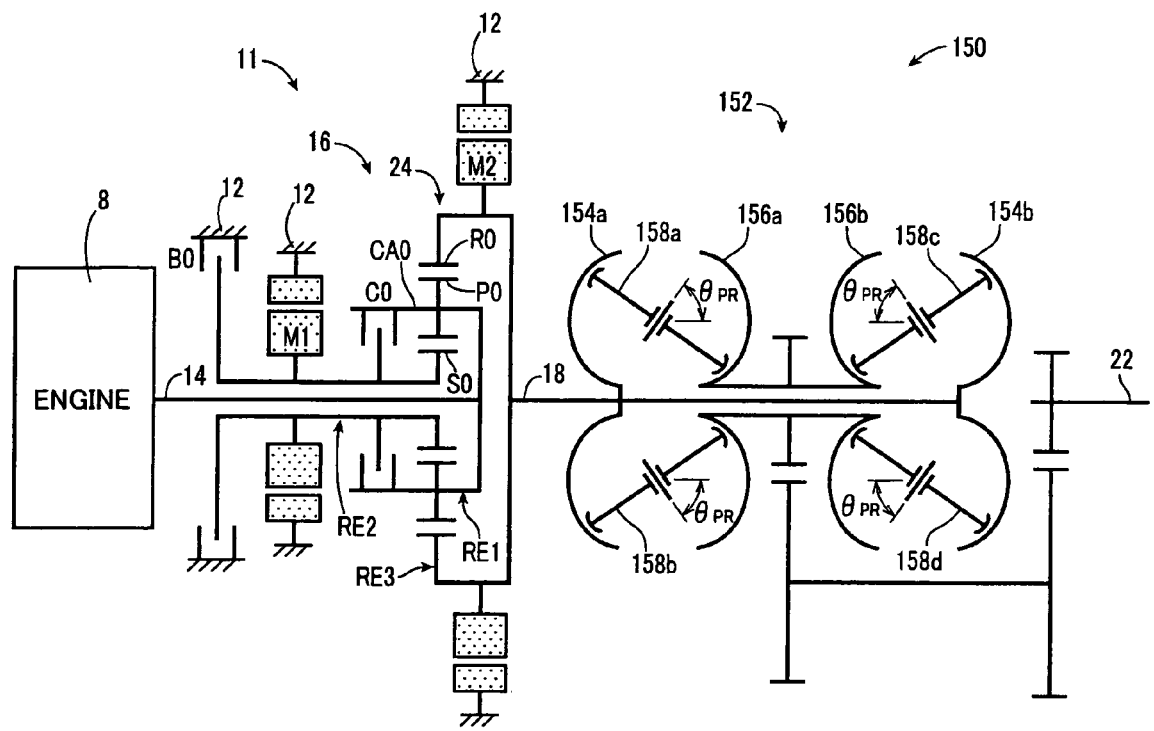
FIG. 20 is a skeleton view illustrating a shifting mechanism of still another embodiment according to the present invention.

FIG. 20 is a skeleton view illustrating a shifting mechanism 150 of another embodiment according to the present invention. The shifting mechanism 150, shown in FIG. 20, differs from the shifting mechanism 100, shown in FIG. 19, in that the continuously variable shifting portion 102, composed of the belt type CVT shifting device, is replaced with a continuously variable shifting portion 152 composed of a toroidal type CVT shifting device. Hereunder, description will be made mainly with a focus on such a differing point. In addition, since the present embodiment operates on the same functional block diagram and the flow chart as those of the embodiment previously mentioned above, description of the same is herein omitted. Also, the continuously variable shifting portion 152 of the present embodiment corresponds to the shifting portion of the present invention.

The shifting mechanism 150, shown in FIG. 20, is preferably applied to a longitudinally mounted FR (front engine and rear drive) for a hybrid vehicle. The continuously variable shifting portion 152 includes a so-called toroidal type CVT shifting device operative to function as a continuously variable automatic transmission that can continuously vary a speed ratio $\gamma_{CVT}$ in a mechanical action.

The continuously variable shifting portion 152 includes two input discs 154a and 154b, two output discs 156a and 156b, and a total of four power rollers 158a, 158b, 158c and 158d. The two input discs 154a and 154b (hereinafter referred to as "input discs 154" unless otherwise identified) are connected to the power transmitting member 18 to be placed on a rotary axis thereof in face-to-face relation. The two output discs 156a and 156b (hereinafter referred to as "output discs 156" unless otherwise identified) are disposed between the two input discs 154a and 154b in face-to-face relation thereto, respectively, in connection to the output shaft 22 on the same rotary axis as that of the power transmitting member 18, The total of four power rollers 158a, 158b, 158c and 158d (hereinafter referred to as "power roller 158" unless otherwise identified) disposed between the two input discs 154a and 154b, are placed in face-to-face relation to each other, and between the two output discs 156a and 156b, placed in face-to-face relation to each other, with two rollers supported on rotary axes placed in symmetric relation with respect to the rotary axis.

The input discs 154 and the output discs 156, both of which are placed in face-to-face relation to each other, respectively, are pressed in directions to be closer to each other with opposing surfaces of each pair being held in contact with outer circumferential peripheries of the two power rollers 158 having the rotary axes intersecting the rotary axis of the power transmitting member 18 to generate frictional forces. With a view to sustaining such frictional contacts while supporting rotary shafts of the power rollers 158 for swingablly moving capability, the input discs 154 and the output discs 156 have contact surfaces, formed in circular-arc shapes in cross section, which are held in contact with the opposing power rollers 158, respectively. With the continuously variable shifting portion 152 of such a structure, a first power transmitting path is established with one set of the input disc 154a, the power rollers 158a and 158b and the output disc 156a, and a second power transmitting path is established with the other set of the input disc 154b, the power rollers 158c and 158d and the output disc 156b. These sets are disposed in line with the rotary axis of the power transmitting member 18 in series in terms of a mechanical arrangement and placed in parallel to each other in terms of a power transmitting path. This allows drive torque, delivered from the power transmitting member 18 to be transferred to the input discs 154, the power rollers 158 and the output discs 156 in a sequential order through the two paralleled power transmitting paths placed in the continuously variable shifting portion 152. Thereafter, drive torque is transferred to the drive wheels 38 via the output shaft 22 connected to the output disc 156.

With the continuously variable shifting portion 152, the rotary axes of the power rollers 158 having outer circumferential peripheries held in frictional contact with the input discs 154 and the output discs 156 respectively, is arranged to intersect the rotary axis of the power transmitting member 18 at angles $\theta_{PR}$ (see FIG. 20), respectively. Causing the rotary axes of the four power rollers 158 to simultaneously vary at the same angles results in variations in a ratio between a radius (effective diameter) between contact points in which the power rollers 158 are held in contact with the input discs 154, and a radius (effective diameter) between contact points in which the power rollers 158 are held in contact with the output discs 156. This allows the continuously variable shifting portion 152 to provide a speed ratio $\gamma_{CVT}$ in a continuously varying mode.

More particularly, the smaller the angle $\theta_{PR}$, the greater will be the radius between the contact points of the input discs 154 with a resultant radius between the contact points of the output discs 156, thereby lowering the speed ratio $\gamma_{CVT}$ of the continuously variable shifting portion 152.

Even with the shifting mechanism 150 of such a structure set forth above, the continuously variable shifting portion 152 can be arranged in structure to operate in a step-variable mode with the use of a manual shift or the like. In such a case, the continuously variable shifting portion 152 bears the same issues as those encountered in the embodiment mentioned above. Therefore, in using the continuously variable shifting portion 152 arranged to operate in the step-variable mode, applying the shift interval altering means 70 or the shift timing altering means 80 allows the continuously variable shifting portion 152 to have the same advantageous effects as those of the embodiment mentioned above.

In the foregoing, although the embodiments of the present invention have been described with reference to the accompanying drawings, the present invention may be implemented even in other modes.

With the previous embodiments set forth above, while the interval L and the shift-operation initiation timing t1 have been determined based on the determination results of, for instance, the operating load determining means 72, the gear position determining means 74 and the working oil temperature determining means 76, no need necessarily arises to make such a determination based on all of these determination results. It does matter if any of these determination results are selectively applied like an attempt to determine the interval L and the shift-operation initiation timing t1 based on only the determination result of, for instance, the working oil temperature determining means 76.

With the previous embodiments, further, while the boundary line for the operation initiation, defined in terms of the first electric motor M1, and the boundary line for the actual shift initiation are made symmetric with respect to the torque axis and rotation speed axis, no need necessarily arises to take such a symmetric arrangement and it doesn't matter if asymmetric boundary lines are employed. Likewise, in altering the interval L and the shift-operation initiation timing t1, no need arises for the boundary line for the operation initiation and the boundary line for the actual shift initiation to be altered in symmetric relation and it doesn't matter if the alteration is made in asymmetric relation.

With the embodiments set forth above, furthermore, while the interval L is defined in terms of torque $T_{M1}$ and the rotation speed $N_{M1}$ of the first electric motor M1, it doesn't matter if the interval L is defined in terms of any one of torque $T_{M1}$ and the rotation speed $N_{M1}$.

With the embodiments mentioned above, although the second electric motor M2 is directly connected to the power transmitting member 18, the present invention is not limited to such a connecting position of the second electric motor M2. The second electric motor M2 may be directly connected to the power transmitting path between the differential portion 11 and the drive wheels 38 or may be indirectly connected thereto via a transmission or the like.

With the above embodiments, while the differential portion 11 is configured to function as the electrically controlled continuously variable transmission in which the speed ratio $\gamma 0$ is continuously varied from the minimal value $\gamma 0_{min}$ to the maximal value $\gamma 0_{max}$, the present invention may be applied even to a case wherein the speed ratio $\gamma 0$ of the differential portion 11 is not continuously varied but pretended to vary step-by-step with the use of a differential action.

With the power distribution mechanism 16 of the embodiments, the differential-portion carrier CA0 is connected to the engine 8; the differential-portion sun gear S0 is connected to the first electric motor M1; and the differential-portion ring gear R0 is connected to the power transmitting member 18. However, the present invention is not necessarily limited to such connecting arrangement, and the engine 8, first electric motor M1 and power transmitting member 18 have no objection to be connected to either one of the three elements CA0, S0 and R0 of the differential-portion planetary gear set 24.

In the embodiments, although the engine 8 is directly connected to the input shaft 14, these component parts may suffice to be operatively connected via, for instance, gears, belts or the like. The engine 8 and the input shaft 14 need not be disposed on a common axis.

Further, while in the embodiments, with the first electric motor M1 and the second electric motor M2 being disposed coaxial with the input shaft 14, the first electric motor M1 is connected to the differential-portion sun gear S0, and the second electric motor M2 is connected to the power transmitting member 18. However, no need arises for these component parts to be necessarily placed in such connecting arrangement. For example, the first electric motor M1 may be connected to the differential-portion sun gear S0 through gears, a belt or the like, and the second electric motor M2 may be connected to the power transmitting member 18.

With the embodiments mentioned above, further, the hydraulically controlled frictional engaging devices, such as the first and second clutches C1 and C2, may be comprised of magnetic powder type engaging devices, such as powder (magnetic powder) clutches, electromagnetic clutches and meshing type dog clutches, etc., electromagnetic type engaging devices and mechanical type engaging devices. With, for instance, such electromagnetic clutches being in use, the hydraulic control circuit 42 may not be of a valve device with which hydraulic passageways are switched but include a switching device or an electromagnetic switching device, etc., which are arranged to switch an electric command signal circuit to deliver command signals to the electromagnetic clutches.

With the embodiments mentioned above, furthermore, while the automatic shifting portion 20 is connected to the differential portion 11 in series via the power transmitting member 18, a countershaft may be provided in parallel to the input shaft 14 to allow the automatic shifting portion 20 to be concentrically placed on the countershaft. In such a case, the differential portion 11 and the automatic shifting portion 20 may be connected to each other via one set of power transmitting members composed of, for instance, a counter gear pair, a sprocket and a chain serving as the power transmitting member 18.

Further, the power distributing mechanism 16 of the embodiments described above may be of a differential gear device in which a pinion rotatably driven with, for instance, an engine, and a pair of bevel gears meshing with the pinion are operatively connected to the first electric motor M1 and the power transmitting member 18.

Furthermore, although the power distributing mechanism 16 of the embodiments described above is structured of one set of planetary gear devices, the power distributing mechanism 16 may include two or more planetary gear units so as to function as a transmission operative to provide three or more gear positions under a non-differential state (fixed shifting state). In addition, the planetary gear units may not be limited to the single pinion types but may be of double-pinion type planetary gear units. Moreover, even with the structure composed of such two or more planetary gear units, it doesn't matter if the engine 8, the first and second electric motors m1 and M2 and the power transmitting members 18 are connected to rotary elements of these planetary gear units for power transmitting capability. With such a structure, the clutch C and the brake B may be connected the respective rotary elements of these planetary gear units and controlling the clutch C and the brake B allows a step-variable shifting mode and a continuously variable shifting mode to be selectively switched.

With the embodiments mentioned above, besides, although the engine 8 and the differential portion 11 are directly connected to each other, these component parts do not necessarily need to be directly connected to each other and the engine 8 and the differential portion 11 may be connected to each other via a clutch.

With the embodiments mentioned above, further, although the differential portion 11 and the automatic shifting portion 20 has a structure formed in a direct connection, the present invention is not particularly limited to such a structure. The present invention may be applied to a structure having a function to cause a whole of the shifting mechanism 10 to perform an electrically controlled differential action and another function causing the whole of the shifting mechanism 10 to perform a shifting on the principle different from the shifting due to the electrically controlled differential action. Thus, no need arises for the differential portion 11 and the automatic shifting portion 20 to be mechanically independent from each other. In addition, the present invention is not particularly limited to a layout position and a layout sequence of these component parts, which may be arranged in a free layout. Moreover, the present invention may have an application to a structure even in the presence of partially duplicated structures or all of the structures common to each other provided that the shifting mechanism has the function to perform the electrically controlled differential action and another function to perform the shifting.

With the embodiments mentioned above, furthermore, although the step-variable transmission is applied to the automatic shifting portion 20 to enable the shifting in the four gear positions, the gear positions of the automatic shifting portion 20 are not limited to the four gear positions and may be freely altered to, for instance, to shifting in five gear positions. Further, the automatic shifting portion 20 is not particularly limited in structure to the illustrated embodiments and may be freely altered. In addition, the shifting portion is not limited to the automatic shifting portion 20 of the step-variable type and the continuously variable shifting portions 102 and 152 of the continuously variable type and may be freely altered to a structure including a shifting portion enabling a speed ratio to vary in a stepwise fashion.

With the embodiments mentioned above, moreover, although the switching clutch C0 is of the type that can selectively provide a connection between the differential-portion sun gear S0 and the differentia-portion carrier CAO, the switching clutch C0 may not be of such a type. For instance, the present invention may be applied to a structure provided that at two rotary elements among the differential-portion sun gear S0, the differentia-portion carrier CAO and the differential-portion ring gear RO, i.e., for instance, the differential-portion sun gear S0 and the differential-portion ring gear RO, are selectively connected to each other.

Needless to say, what are above mentioned are only some of the embodying modes or the embodiments of the present invention, and accordingly, the present invention can be embodied in other embodying modes or embodiments along the knowledge of the skilled person.

What is claimed is:

1. A control device for a vehicle power transmitting apparatus having (i) an electrically controlled differential portion operative to control an operating state of an electric motor connected to rotary elements of a differential mechanism in a power transmissive state, for controlling a differential state between a rotation speed of an input shaft to which a drive force source is connected, and a rotation speed of an output shaft, and (ii) a shifting portion forming a part of a power transmitting path between the electrically controlled differential portion and drive wheels, the control device comprising:

a processor including an alternator that alters an interval from an operation initiation executing a shifting in the shifting portion to an actual shift initiation depending on a type of the shifting.

2. The control device for the vehicle power transmitting apparatus according to claim 1, wherein the interval is defined in terms of torque and/or rotation speed of the electric motor.

3. The control device for the vehicle power transmitting apparatus according to claim 1, wherein the interval is defined in terms of an output of the electric motor.

4. The control device for the vehicle power transmitting apparatus according to claim 1, wherein the interval is determined such that the greater an operating load, the greater will be the interval.

5. The control device for the vehicle power transmitting apparatus according to claim 1, wherein the interval is determined such that the lower temperature of a working oil of the vehicle power transmitting apparatus, the greater will be the interval.

6. The control device for the vehicle power transmitting apparatus according to claim 1, wherein the interval is determined such that the higher temperature of a working oil of the vehicle power transmitting apparatus, the greater will be the interval.

7. The control device for the vehicle power transmitting apparatus according to claim 1, wherein the interval is determined such that the greater a speed ratio of the shifting portion, the greater will be the interval.

8. The control device for the vehicle power transmitting apparatus according to claim 1, wherein the interval is determined such that the greater a step ratio of the shifting portion before and after the shifting, the greater will be the interval.

9. The control device for the vehicle power transmitting apparatus according to claim 1, wherein the shift initiation is a torque phase initiation or an inertia phase initiation.

10. The control device for the vehicle power transmitting apparatus according to claim 1, wherein a speed ratio of the shifting portion is step variable.

11. A control device for a vehicle power transmitting apparatus having (i) an electrically controlled differential portion operative to control an operating state of an electric motor connected to rotary elements of a differential mechanism in a power transmissive state, for controlling a differential state between a rotation speed of an input shaft to which a drive force source is connected, and a rotation speed of an output shaft, and (ii) a shifting portion forming a part of a power transmitting path between the electrically controlled differential portion and drive wheels, the control device comprising:

a processor including an alternator that alters a timing, at which an operation initiation allows a shifting to be executed in the shifting portion, depending on a type of the shifting.

12. The control device for the vehicle power transmitting apparatus according to claim 11, wherein a timing for the operation initiation is defined in terms of torque and/or rotation speed of the electric motor.

13. The control device for the vehicle power transmitting apparatus according to claim 11, wherein a timing for the operation initiation is defined in terms of an output of the electric motor.

14. The control device for the vehicle power transmitting apparatus according to claim 11, wherein a timing for the operation initiation is determined such that the greater an operating load, the faster will be the timing for the operation initiation.

15. The control device for the vehicle power transmitting apparatus according to claim 11, wherein a timing for the operation initiation is determined such that the lower temperature of a working oil of the vehicle power transmitting apparatus, the faster will be the timing for the operation initiation.

16. The control device for the vehicle power transmitting apparatus according to claim 11, wherein a timing for the operation initiation is determined such that the higher temperature of a working oil of the vehicle power transmitting apparatus, the faster will be the timing for the operation initiation.

17. The control device for the vehicle power transmitting apparatus according to claim 11, wherein a timing for the operation initiation is determined such that the greater a speed ratio of the shifting portion, the faster will be the timing for the operation initiation.

18. The control device for the vehicle power transmitting apparatus according to claim 11, wherein a timing for the operation initiation is determined such that the greater a step ratio of the shifting portion before and after the shifting, the faster will be the timing for the operation initiation.

19. The control device for the vehicle power transmitting apparatus according to claim 11, wherein a speed ratio of the shifting portion is step variable.

20. The control device for the vehicle power transmitting apparatus according to claim 11, wherein a timing for the operation initiation is determined such that the longer a time period from the operation initiation to an actual shift initiation, the faster will be the timing for the operation initiation.

* * * * *